United States Patent
Sasaki

(10) Patent No.: US 7,983,561 B2
(45) Date of Patent: Jul. 19, 2011

(54) OPTICAL PULSE TIME SPREADING DEVICE

(75) Inventor: Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 614 days.

(21) Appl. No.: 12/213,387

(22) Filed: Jun. 18, 2008

(65) Prior Publication Data

US 2009/0010646 A1  Jan. 8, 2009

(30) Foreign Application Priority Data

Jun. 27, 2007  (JP) .................... 2007-168534

(51) Int. Cl.
    *H04J 4/00*  (2006.01)
(52) U.S. Cl. ............... 398/77; 398/78; 398/98; 398/190; 398/188
(58) Field of Classification Search .............. 398/77–79, 398/89, 98, 190, 188, 75, 47
    See application file for complete search history.

(56) References Cited

U.S. PATENT DOCUMENTS

| | | | |
|---|---|---|---|
| 7,174,103 B2 * | 2/2007 | Nishiki et al. ................ | 398/77 |
| 7,310,465 B2 * | 12/2007 | Nishiki et al. ................ | 385/37 |
| 7,440,656 B2 * | 10/2008 | Sasaki et al. ................. | 385/37 |
| 7,813,652 B2 * | 10/2010 | Sasaki .......................... | 398/190 |
| 2004/0264965 A1 * | 12/2004 | Kobayashi et al. ........... | 398/78 |
| 2006/0115272 A1 * | 6/2006 | Minato et al. ................. | 398/77 |
| 2006/0269286 A1 * | 11/2006 | Sasaki ........................... | 398/77 |
| 2007/0223927 A1 * | 9/2007 | Sasaki et al. ................. | 398/98 |
| 2007/0248303 A1 * | 10/2007 | Sasaki et al. ................. | 385/37 |
| 2010/0074617 A1 * | 3/2010 | Sasaki .......................... | 398/43 |
| 2010/0221010 A1 * | 9/2010 | Sasaki et al. ................. | 398/75 |

OTHER PUBLICATIONS

Sotobayashi, "Optical code division multiplexed network", Oyo Butsurigaku, vol. 71, No. 7 (2002), pp. 853-859.
Wada et al., "A 10 Gb/s Optical Code Division Multiplexing Using 8-Chip Optical Bipolar Code and Coherent Detection", IEEE Journal of Lightwave Technology, vol. 17, No. 10, Oct. 1999.
Nishiki et al., Development of Encoder/Decoder for OCDM using a SSFBG), Technical Report of IEICE, OFT2002-66, Nov. 2002.
Cao et al., "Spectral Encoding and Decoding of Monolithic InP OCDMA Encoder", Paper We.3.6.6, vol. 3, ECOC 2005.
Cong et al., "An Error-Free 100Gb/s Time-Slotted SPECTS O-CDMA Network Testbed", Paper Th.1.4.6, vol. 3, ECOC 2005.

* cited by examiner

*Primary Examiner* — Ken N Vanderpuye
*Assistant Examiner* — Hibret A Woldekidan
(74) *Attorney, Agent, or Firm* — Rabin & Berdo, P.C.

(57) ABSTRACT

An optical pulse time spreading device includes S optical pulse time spreading elements that spread input optical pulses into trains of (N×j) chip pulses, where j is an integer greater than zero, S is an integer greater than one, and N is an integer equal to or greater than S. In the chip pulse trains output by the n-th optical pulse time spreading element (n=1, 2, ..., S), the light in successive chip pulses is shifted in phase by successive integer multiples of the quantity $2\pi\{a+(n-1)/N\}$, where a is an arbitrary constant ($0 \leq a < 1$). In an optical code-division multiplexing system, this optical pulse time spreading device produces an autocorrelation wave with a high energy and a high signal-to-noise ratio.

12 Claims, 16 Drawing Sheets

OPTICAL PULSE TIME SPREADING DEVICE

BACKGROUND OF THE INVENTION

1. Field of the Invention

The present invention relates to an optical pulse time spreading device for use in code division multiplexed optical telecommunictions, more particularly to an optical pulse time spreading device employing superstructured fiber Bragg gratings.

2. Description of the Related Art

With the spread of the Internet, the demand for telecommunications has grown rapidly, prompting the construction of high-speed, high-capacity optical fiber networks. To increase communication capacity, optical multiplexing is essential. Various optical multiplexing methods, including optical time division multiplexing (OTDM), wavelength division multiplexing (WDM), and optical code division multiplexing (OCDM) are currently undergoing intensive study.

Among these methods, OCDM provides operational flexibility in that there is no limit on the amount of time that may be allocated per bit. OCDM can also be combined with OTDM or WDM.

In OCDM, optical signals for a plurality of communication channels are encoded at the transmitting end, using the same wavelength or group of wavelengths but a different code for each channel. The encoded signals are combined into a single multiplexed signal. The multiplexed signal is decoded at the receiving end, using corresponding codes, to recover the original optical signal in each channel.

OCDM can dramatically increase the capacity of a WDM or OTDM system by enabling a plurality of communication channels to be carried on the same wavelength of light, or in the same time slot. OCDM also offers advantages in terms of security, since a transmitted signal cannot be decoded unless the receiver is in possession of the same code as the transmitter.

OCDM systems can be implemented in various ways. Phase coding, in which a pulse of coherent light representing a bit of data is converted to a train of chip pulses with various phase shifts, has received much attention.

A phase coding OCDM method using planar lightwave circuits (PLCs) including tapped delay lines and optical phase shifters for optical encoding and decoding has been described by Wada et al. in 'A 10 Gb/s Optical Code Division Multiplexing Using 8-Chip Optical Bipolar Code and Coherent Detection', *IEEE Journal of Lightwave Technology*, Vol. 17, No. 10, October 1999.

A phase coding OCDM method using transversal optical filters for encoding and decoding has been described by Sotobayashi in 'Hikari fugo bunkatsu taju nettowaku" (Optical code division multiplexed networks), *Oyo Butsurigaku*, Vol. 71, No. 7 (2002), pp. 853-859).

A phase coding OCDM method using liquid-crystal light phase modulators for encoding and decoding has been described by Cong et al. in 'An Error-Free 100 Gb/s Time Slotted SPECTS-CDMA Network Testbed', Paper Th. 1.4.6, Vol. 3, ECOC 2005.

A phase coding OCDM method using arrayed waveguide gratings (AWGs) for encoding and decoding has been described by Cao et al. in 'Spectral Encoding and Decoding of Monolithic InP OCDMA Encoder', Paper We.3.6.6, Vol. 3, ECOC 2005.

A phase coding OCDM communication method using superstructured fiber Bragg gratings (SSFBGs) for encoding and decoding has been described by Nishiki et al. in 'SSFBG wo mochiita OCDM yo iso fugoki no kaihatsu' (Development of a phase coder for OCDM using an SFFBG), Technical Report of IEICE, OFT2002-66 (November 2002).

In all of these conventional methods, the different codes are different sequences constructed from the same limited set of phase shifts: four phase shifts ($0, \pi/2, \pi,$ and $3\pi/2$) in Sotobayashi's method, and just two phase shifts ($0$ and $\pi$) in the other methods.

An SSFBG and some of the other devices used in these conventional methods have the advantage of being passive optical components that do not consume electrical power. Passive optical components are also not limited by electrical signal processing speeds, so communication equipment using them can be easily adapted to handle future increases in transmission rates.

An SSFBG has the further advantage of being essentially just a length of optical fiber, with the same fiber geometry as the optical fiber used for transmission in optical communication systems employing the overlapped domain decomposition method (ODDM). An SSFBG can therefore be installed in an optical transmission system by fiber-to-fiber coupling, which is simpler than connecting an optical fiber to a different type of device such as a PLC.

A still further advantage of an SSFBG over a PLC or AWG is its small size and comparatively low optical loss.

When used for OCDM communication by the conventional method, however, an SSFBG provides an inadequate signal-to-noise ratio (auto-correlation to cross-correlation energy ratio). The basic reason is that the autocorrelation process used to decode the received signal includes much destructive interference. Further details will be given in the detailed description of the invention.

The same problem arises in the other conventional OCDM methods described in the references above.

SUMMARY OF THE INVENTION

A general object of the present invention is to provide an optical pulse time spreading device that affords an improved signal-to-noise ratio in OCDM communication.

A more specific object is to provide an optical pulse time spreading device that produces an autocorrelation wave with increased energy.

The invention provides a novel optical pulse time spreading device comprising S optical pulse time spreading elements, each spreading an input optical pulse into a chip pulse train including (N×j) chip pulses, where j is an integer greater than zero, S is an integer greater than one, and N is an integer equal to or greater than S.

The n-th optical pulse time spreading element (n=1, 2, ..., S) has (N×j) phase controllers that control the phases of light in the (N×j) chip pulses so that, referenced to the phase of light in the first chip pulse, the phases of the light in the (N×j) chip pulses are successive integer multiples of the quantity $2\pi\{a+(n-1)/N\}$, from zero to $2\pi\{a+(n-1)/N\}\times\{(N\times j)-1\}$, where a is an arbitrary parameter equal to or greater than zero but less than one.

The phase controllers are preferably diffraction gratings disposed at regular intervals in an optical waveguide. The optical waveguide is preferably an optical fiber, and the diffraction gratings are preferably fiber Bragg gratings, in which case each optical pulse time spreading element is an SSFBG.

The invention also provides a novel optical communication system and method in which the novel optical pulse time spreading device is used to convert S optical signals to chip pulse trains, which are transmitted as a single multiplexed optical signal. An identical optical pulse time spreading device is used to demultiplex the multiplexed optical signal and recover the S optical signals by generating autocorrelation waves. The optical pulse time spreading device that executes the conversion process functions as an encoder; the identical optical pulse time spreading device that executes the recovery process functions as a decoder.

When the novel optical pulse time spreading device is employed in an OCDM communication system, it provides S code channels corresponding to different values of the parameter n. The optical pulses transmitted on the n-th channel are converted to chip pulse trains by the n-th optical pulse time spreading element in the encoder, and recovered as autocorrelation waves by the n-th optical pulse time spreading element in the decoder. In the recovery of an autocorrelation wave, only constructive interference occurs, so the energy of the autocorrelation wave is higher than the energy of the autocorrelation wave recovered by conventional encoders and decoders, which produce both constructive and destructive interference.

The signal-to-noise ratio, that is, the ratio of the energy of the autocorrelation wave in the n-th channel to the energy of cross-correlation waves generated from received chip pulse trains belonging to other channels, is also higher than the signal-to-noise ratio produced by conventional encoders and decoders.

If the phase controllers are diffraction gratings disposed in a waveguide, the novel optical pulse time spreading device is relatively easy to fabricate.

If the optical pulse time spreading elements are SSFBGs, the novel optical pulse time spreading device is particularly easy to fabricate, and can be easily installed in a fiber-optic communication system.

DETAILED DESCRIPTION OF THE INVENTION

Embodiments of the invention will now be described with reference to the attached non-limiting drawings. First, however, a more detailed description of a conventional encoder and decoder employing an SSFBG as an optical pulse time spreading device will be given.

The optical signals in the following description are optical pulse signals representing binary digital data in the return-to-zero (RZ) format. That is, the time axis is divided into intervals having a fixed duration equal to the reciprocal of the bit rate; data bits are represented by the presence ('1') or absence ('0') of an optical pulse in each interval; and each interval starts and ends with the optical signal in the '0' state.

Figure 1:
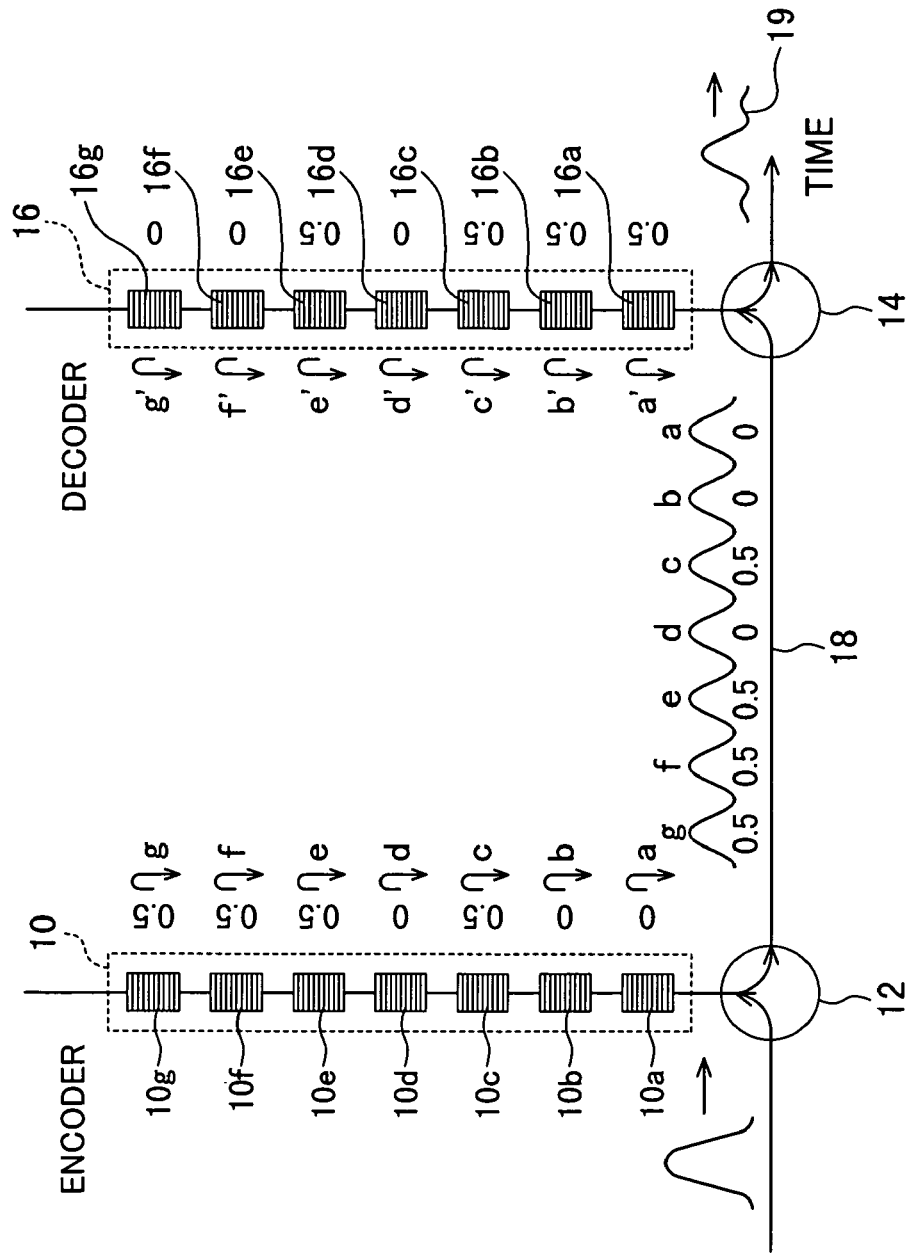
FIG. 1 illustrates a conventional SSFBG encoder and decoder with identical but mutually reversed code series.

FIG. 1 shows a conventional encoder comprising an SSFBG 10 and an optical circulator 12, and a decoder comprising an optical circulator 14 and an SSFBG 16.

An SSFBG is an optical fiber with a core that includes a plurality of fiber Bragg gratings. A fiber Bragg grating (FBG) is a part of the fiber core that has a periodically varying refractive index and accordingly forms a diffraction grating that reflects light of a particular wavelength. The SSFBGs 10, 16 in FIG. 1 have seven unit FBGs each.

An optical pulse entering the encoder is routed by optical circulator 12 to the input-output end of SSFBG 10 and reflected by each of unit FBGs 10a to 10g. The pulse is thereby spread into a series of chip pulses (a-g) that exit the input-output end of the SSFBG 10. The chip pulse train is routed by optical circulator 12 through an optical combiner (not shown) to an optical fiber 18 that leads to the decoder. In the decoder, the chip pulse train is routed through an optical splitter (not shown) and optical circulator 14 to the input-output end of SSFBG 16, reflected by the unit FBGs 16a to 16g in the SSFBG 16, and thereby spread into a series of overlapping chip pulse trains a'-g' that combine by mutual interference and exit the input-output end of SSFBG 10 as an autocorrelation wave 19, which is output through optical circulator 14.

The unit FBGs are precisely spaced to control the phase of the light constituting the reflected chip pulses. The numbers 0 and 0.5 beside the unit FBGs represent the phase of the reflected light relative to the phase of the light reflected by the unit FBG 10a or 16a adjacent the input-output end of the SSFBG. The number 0 (zero) indicates that the reflected light has the same phase as the light reflected by FBG 10a or 16a. The number 0.5 indicates that the phase of the reflected light is shifted by 0.5λ with respect to the phase of the light reflected by unit FBG 10a or 16a where λ is the wavelength of the light. In terms of phase angle, a 0.5 phase shift is a shift of π radians.

The chip pulse train exiting optical circulator 12 consists of three chip pulses (a, b, d) with mutually identical phase (0), and four chip pulses (c, e, f, g) with the reverse phase (0.5).

The sequence of phase shifts (0, 0, 0.5, 0, 0.5, 0.5, 0.5) in the encoder corresponds to a seven-bit pseudo-random number (PN) sequence (0, 0, 1, 0, 1, 1, 1) of the type known as an M-series. A phase shift of 0 in SSFBG 10 corresponds to a '0' chip in the M-series; a phase shift of 0.5 in SSFBG 10 corresponds to a '1' chip in the M-series. An M-series that specifies a binary code set in an SSFBG will also be referred to below as a code series, and its constituent 0's and 1's as chips. The code series (0, 0, 1, 0, 1, 1, 1) provides a code length of seven chips.

Figure 2:
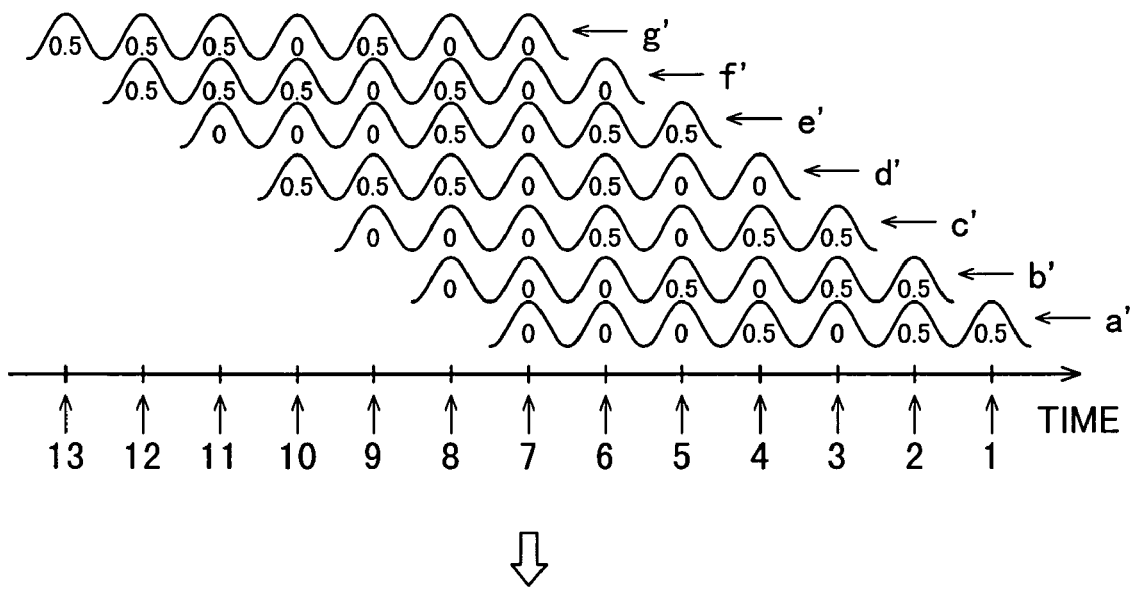
FIGS. 2 and 3 illustrate the process by which an autocorrelation wave is produced from a transmitted chip pulse train.

The SSFBG 16 in the decoder has the same code series with the reverse order of chips (1, 1, 1, 0, 1, 0, 0). The entering pulse train is reflected by unit FBG 16a and exits SSFBG 16 as a chip pulse train a' with the relative phase values (0.5, 0.5, 0, 0.5, 0, 0, 0) as read in time sequence from right to left at the bottom of FIG. 2. The entering pulse train is also reflected by unit FBGs 16b, 16c, and 16e and exits SSFBG 16 as chip pulse trains b', c', and e' with the same relative phase values but with relative delays of one, two, and four chips, respectively. Reflection by unit FBGs 16d, 16f, and 16g produces chip pulse trains d', f', and g' with the reverse relative phase values and relative delays of three, five, and six chips. Chip pulse positions from the first chip pulse in chip pulse train a' to the last chip pulse in chip pulse train g' are indicated on the time axis in FIG. 2 by successive integers from one to thirteen.

Figure 3:
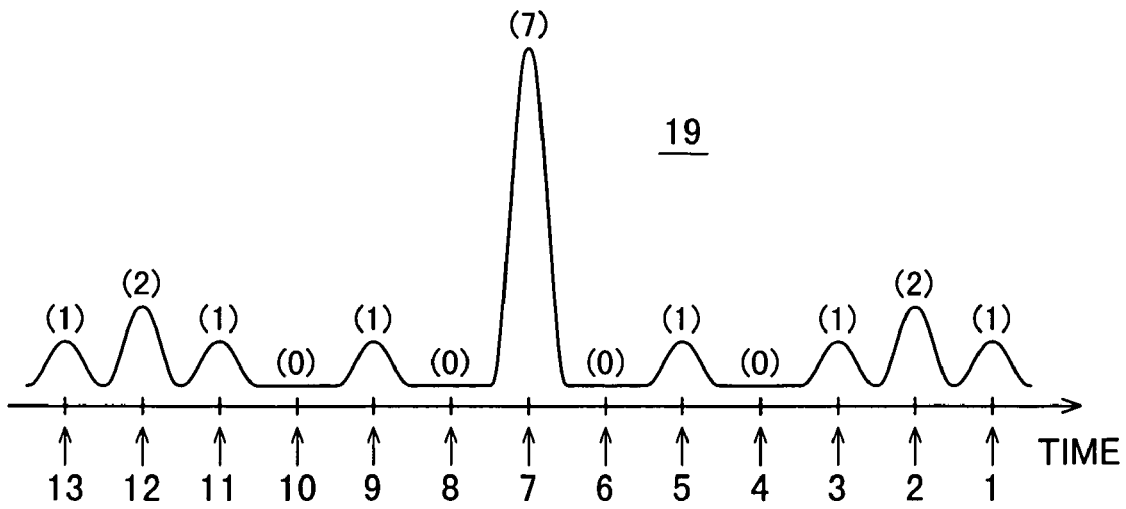

The reflected chip pulse trains a' to g' interfere with one another to produce the autocorrelation wave 19 shown in FIG. 3. The first chip pulse in chip pulse train g', the second chip pulse in chip pulse train f', the third chip pulse in chip pulse train e', the fourth chip pulse in chip pulse train d', the fifth chip pulse in chip pulse train c', the sixth chip pulse in chip pulse train b', and the seventh chip pulse in chip pulse train a' interfere constructively to produce a chip pulse at the seventh chip pulse position with seven times the amplitude of the chip pulses in the individual chip pulse trains in FIG. 2. At the other chip pulse positions, various combinations of constructive and destructive interference occur to produces chip pulses with amplitudes not exceeding twice the amplitude of the chip pulses in the individual chip pulse trains.

Since energy is proportional to the square of amplitude, the combined pulse at the seventh position has forty-nine times the energy of the chip pulses in the individual chip pulse trains. The sum of the amplitudes of the combined pulses in the autocorrelation wave is seventeen times the pulse amplitude in the individual chip pulse trains (1+2+1+0+1+0+7+0+1+0+1+2+1=17).

Figure 4:
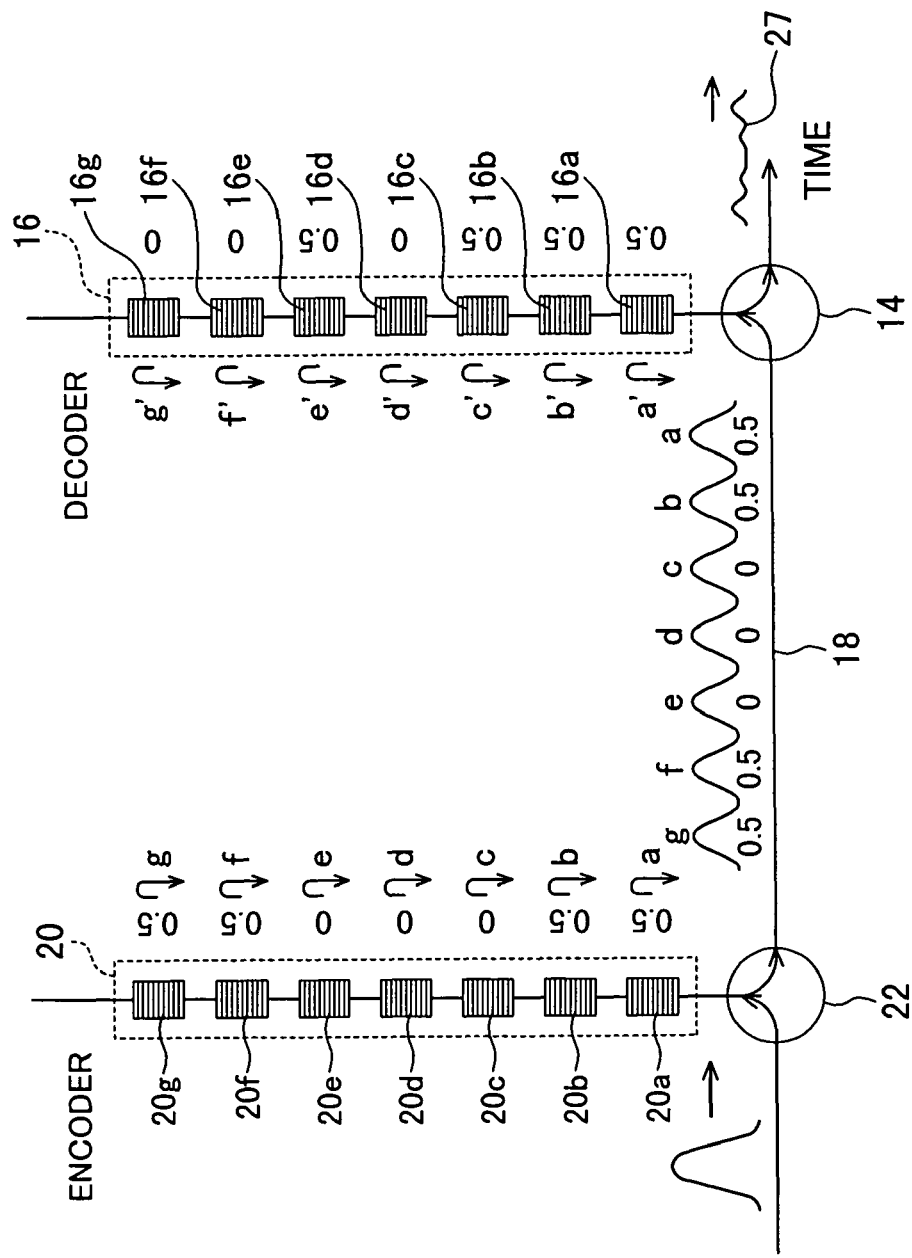
FIG. 4 illustrates a conventional SSFBG encoder and decoder with differing code series.
Figure 5:
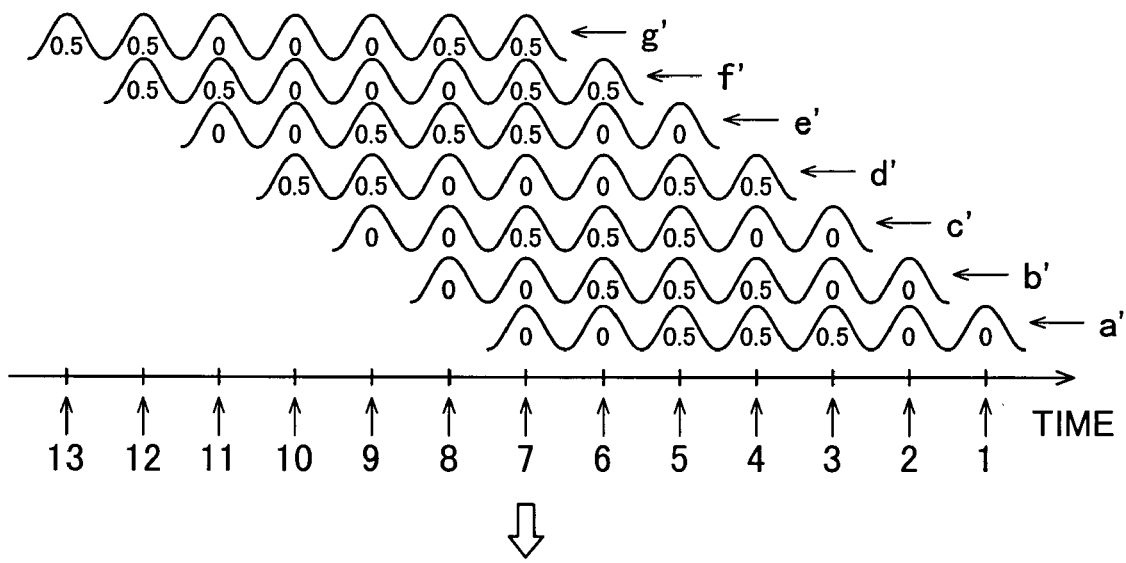
FIGS. 5 and 6 illustrate the process by which a cross-correlation wave is produced from a transmitted chip pulse train.
Figure 6:
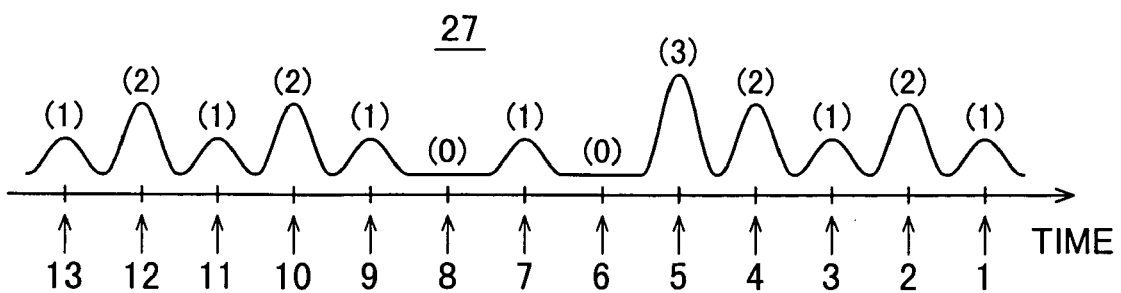

In an OCDM system, chip pulse trains produced by encoders with different code series propagate together in the same optical fiber. FIGS. 4, 5, and 6 show what happens when an optical pulse encoded by an SSFBG 20 with a different code series is decoded by the same decoder as in FIG. 1.

Referring to FIG. 4, the encoder now comprises an SSFBG 20 with the code series (1, 1, 0, 0, 0, 1, 1). The unit FBGs 20a to 20g in SSFBG 20 produce corresponding phase shifts (0.5, 0.5, 0, 0, 0, 0.5, 0.5), as indicated. An optical pulse input to the encoder through optical circulator 22 is spread into a chip pulse train (chip pulses a-g) in which the phase of the light, referenced to the phase of the light in the first chip pulse (a) in FIG. 1, has corresponding values (0.5, 0.5, 0, 0, 0, 0.5, 0.5) in successive chips.

This chip pulse train travels through optical fiber 18 to the decoder, which has the same optical circulator 14, SSFBG 16, unit FBGs 16a to 16g, and phase shifts (0.5, 0.5, 0.5, 0, 0.5, 0, 0) as in FIG. 1. SSFBG 16 converts the entering chip pulse train to mutually delayed chip pulse trains a' to g' with the relative phase values shown in FIG. 5. These chip pulse trains a' to g' interfere to generate the cross-correlation wave 27 shown in FIG. 6, including chip pulses with amplitudes of up to three times the amplitude of the chip pulses in the chip pulse trains in FIG. 5. The sum of these amplitudes is again seventeen times the amplitude of the chip pulses in the individual chip pulse trains (1+2+1+2+1+0+1+0+3+2+1+2+1=17), but the energy of the highest pulse is now only nine times the energy of the chip pulses in the individual chip pulse trains ($3^2$=9).

The higher peak energy of the autocorrelation waveform in FIG. 3 enables the intended signal to be detected above the noise of signals transmitted in other code channels, but the average pulse amplitude of the autocorrelation wave in FIG. 3 is equal to the average pulse amplitude of the cross-correlation wave in FIG. To detect the autocorrelation peak reliably when many competing code channels are present, it is necessary to restrict the integration time of the detector to a short interval in which the peak occurs, by using a time gate such as the nonlinear optical loop mirror employed by Cong et al. This type of time gating requires expensive optical components and reduces the detectable energy of the autocorrelation wave.

Next an SSFBG exemplifying the optical pulse time spreading elements used in the following embodiments of the invention will be described.

Figure 7:
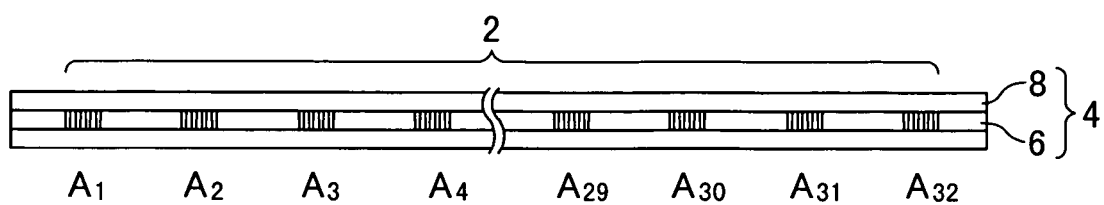
FIG. 7 schematically illustrates an SSFBG used in embodiments of the invention.

Referring to FIG. 7, this exemplary SSFBG 2 is formed in an optical fiber 4 having a core 6 and a cladding 8. The SSFBG 2 comprises thirty-two identical unit FBGs $A_1$ to $A_{32}$ spaced at equal intervals in the fiber core 6.

Figure 8:
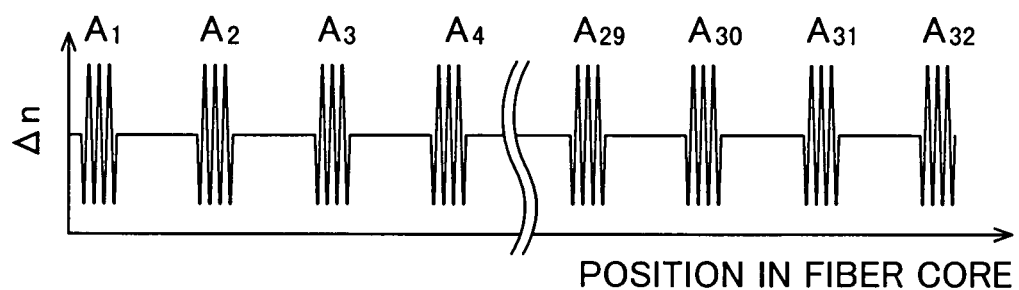
FIG. 8 schematically illustrates the refractive-index modulation structure of the SSFBG in FIG. 7.

Referring to the graph in FIG. 8, a unit FBG is formed by modulating the refractive index of the fiber core 6 so that it is alternately greater than and less than the effective refractive index of the core. The vertical axis in FIG. 8 indicates the index modulation amount Δn; the horizontal axis indicates longitudinal position in the core.

Figure 9:
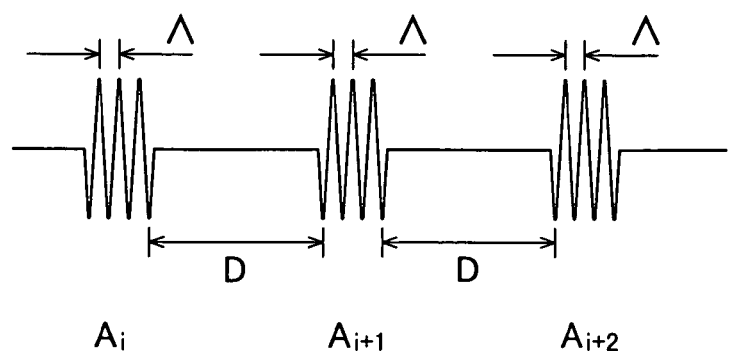
FIG. 9 is an enlarged view of part of the refractive-index modulation structure in FIG. 8.

Referring to the enlarged portion of this graph shown in FIG. 9, the repeating period of the index modulation in each unit FBG has a constant value denoted Λ. The modulation causes the FBG to reflect light with a wavelength λ equal to twice the product of the repeating period and the effective refractive index $N_{eff}$ of the core ($\lambda = 2N_{eff}\Lambda$). Reflection is not total; only part of the light is reflected. An optical pulse entering the SSFBG 2 is therefore reflected by all thirty-two FBGs and spread into a train of thirty-two chip pulses, each chip pulse being produced by reflection in a corresponding one of the thirty-two unit FBGs.

The distance D from an arbitrary peak in the index modulation pattern of unit FBG $A_i$ to an arbitrary peak in the next index modulation pattern of unit FBG $A_{i+1}$ where i is any integer from one to thirty-one, determines the difference d between the phase $P_i$ of light reflected by unit FBG $A_i$ and the phase $P_{i+1}$ of light reflected by unit FBG $A_{i+1}$. The relation between distance and phase is $$D = (M+d)\lambda/2$$

where M is an arbitrary integer and d takes values from zero to one ($0 \leq d < 1$). The wavelength λ is equal to $\lambda_0/N_{eff}$, where $\lambda_0$ is the wavelength that the optical pulse would have in a vacuum. The distance $(M+d)\lambda/2$ yields an angular phase shift of $2\pi(M+d)$, equivalent to $2\pi d$.

In the n-th optical pulse time spreading element in the following embodiments, the quantity d is set to a value of the form a+(n−1)/N, where N is an integer greater than one and a is a non-negative number less than one. To obtain relative phase values equal to successive integer multiples of $2\pi\{a+(n-1)/N\}$, the distance D is set to a value of the form $(M+a+(n-1)/N)\lambda/2$.

Since the spacing between adjacent FBGs is constant, if the distance D from the first unit FBG $A_1$ to the second FBG $A_2$ has the form $(M+a+(n-1)/N)\lambda/2$, then the distance from the first unit FBG $A_1$ to the third FBG $A_3$ necessarily has the form $(M+a+(n-1)/N)\times 2\lambda/2$, and in general the distance from the first unit FBG $A_1$ to the k-th FBG $A_k$ has the form $(M+a+(n-1)/N)\times(k-1)\lambda/2$, for any integer k up to the total number of FBGs in the optical pulse time spreading element. The relative phase of light exiting the n-th optical pulse time spreading element after reflection from the k-th unit FBG $A_k$ is:

$$2\pi\{a+(n-1)/N\}\times(k-1).$$

First Embodiment

Figure 10:
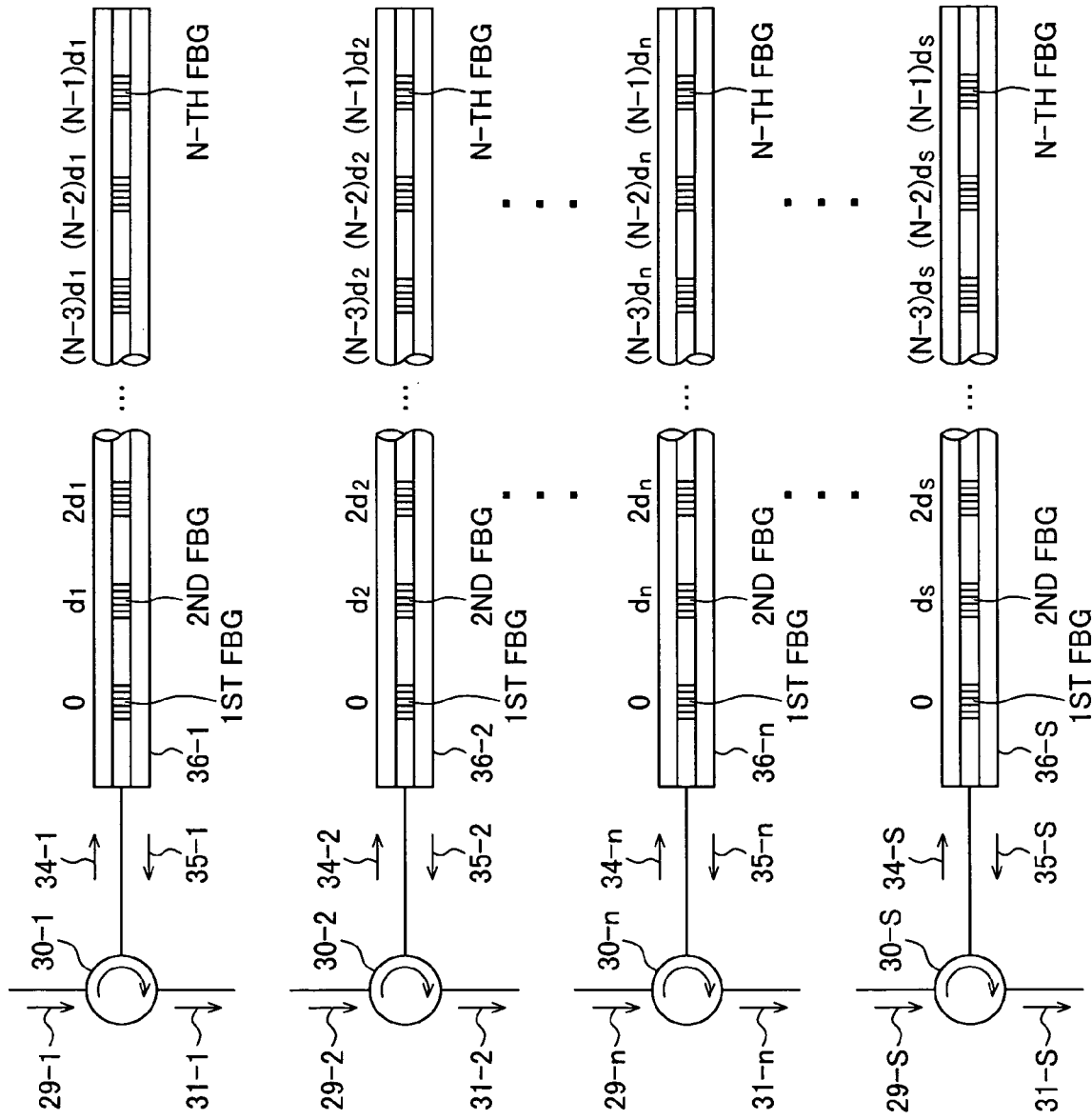
FIG. 10 schematically illustrates an optical pulse time spreading device according to a first embodiment of the invention.

Referring to FIG. 10, the first embodiment is an optical pulse time spreading device that receives S optical pulse signals 29-1 to 29-S, where S in an integer greater than one. The optical pulse time spreading device comprises S optical circulators 30-1 to 30-S that receive the corresponding input optical pulse signals 29-1 to 29-S and output corresponding chip pulse trains 31-1 to 31-S. The optical circulators 30-1 to 30-S are coupled to respective optical pulse time spreading elements 36-1 to 36-S similar to the optical pulse time spreading element depicted in FIGS. 7 to 9, each having N unit FBGs, where N is an integer equal to or greater than S. The parameter j is equal to one.

The first optical pulse time spreading element 36-1 receives an input optical pulse signal 34-1 from optical circulator 30-1 and outputs a chip pulse train 35-1 to optical circulator 30-1. The input optical pulse signal 34-1 is simply the optical pulse signal 29-1 received by optical circulator 30-1, and the output chip pulse train 35-1 becomes the chip pulse train 31-1 output by optical circulator 30-1.

The relative phase difference $d_1$ between light exiting the first optical pulse time spreading element 36-1 after being reflected by adjacent unit FBGs is $2\pi a$, where a is a real number such that $0 \leq a < 1$. If the first chip pulse in the output chip pulse train 35-1 is arbitrarily assigned a phase value of zero, the relative phase of the second chip pulse is $d_1$ or $2\pi a$, and the relative phase of the N-th chip pulse is $(N-1)d_1$ or $2\pi a \times (N-1)$.

Similarly, the second optical pulse time spreading element 36-2 receives optical pulse signal 29-2 from optical circulator 30-2 as its input optical pulse signal 34-2 and outputs a chip pulse train 35-2 that becomes output chip pulse train 31-2. The relative phase difference $d_2$ between light reflected by adjacent unit FBGs is $2\pi(a+(1/N))$. If the phase value of the first chip pulse is zero, the relative phase of the second chip pulse is $d_2$ or $2\pi(a+(1/N))$, and the relative phase of the N-th chip pulse is $(N-1)d_2$ or $2\pi(a+(1/N))\times(N-1)$.

In the same way, the n-th optical pulse time spreading element 36-n receives optical pulse signal 29-n from optical circulator 30-n as its input optical pulse signal 34-n and outputs a chip pulse train 35-n that becomes output chip pulse train 31-n. The relative phase difference $d_n$ between light reflected by adjacent unit FBGs is $2\pi(a+((n-1)/N))$. If the phase value of the first chip pulse is regarded as zero, the relative phase of the second chip pulse is $d_n$ or $2\pi(a+((n-1)/N))$, and the relative phase of the N-th chip pulse is $(N-1)d_n$ or $2\pi(a+((n-1)/N))\times(N-1)$.

The S-th optical pulse time spreading element 36-S receives optical pulse signal 29-S from optical circulator 30-S as its input optical pulse signal 34-n and outputs a chip pulse train 35-S that becomes output chip pulse train 31-S. The relative phase difference $d_S$ between light reflected by adjacent unit FBGs is $2\pi(a+((S-1)/N))$. If the phase value of the first chip pulse is zero, the relative phase of the second chip pulse is $d_S$ or $2\pi(a+((S-1)/N))$, and the relative phase of the N-th chip pulse is $(N-1)d_S$, which is $2\pi(a+((S-1)/N))\times(N-1)$.

When used in optical transmitting apparatus, the optical pulse time spreading device in FIG. 10 may also include an optical combiner for combining the output chip pulse trains 31-1 to 31-S into a single multiplexed optical signal. When used in receiving optical transmitting apparatus, the optical pulse time spreading device in FIG. 10 may also include an optical splitter for splitting a received multiplexed optical signal into S identical optical signals 29-1 to 29-S. The optical combiner and optical splitter will be shown in FIG. 26.

Figure 11:
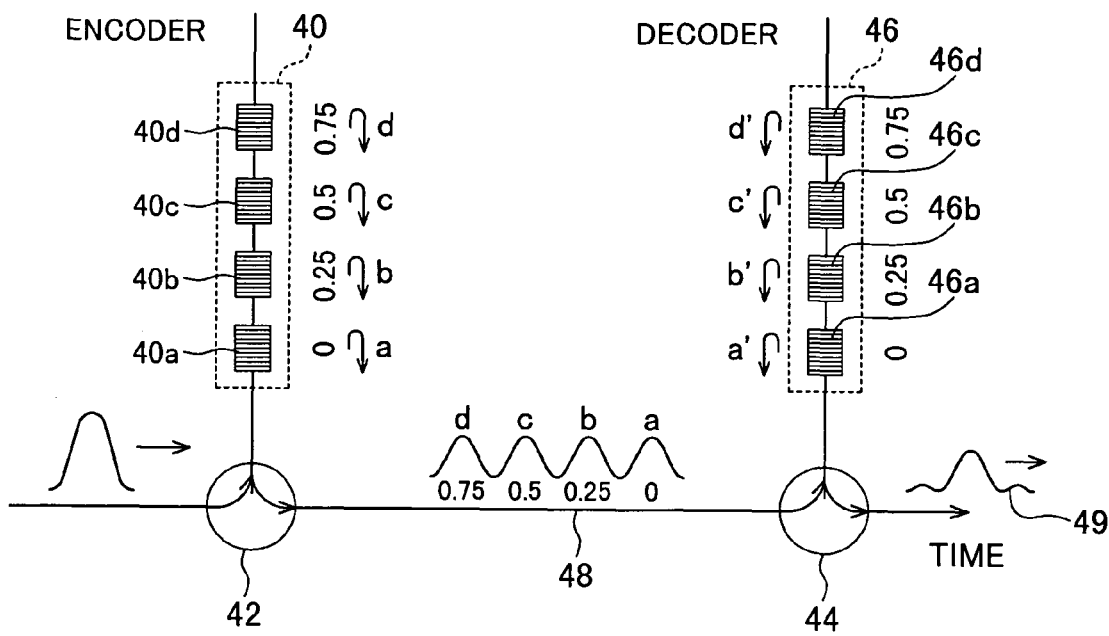
FIGS. 11, 12, and 13 schematically illustrate the recovery of an autocorrelation wave in the first embodiment.

FIG. 11 shows exemplary parts of the first embodiment in which the parameter a is 0.25, n is one, and N is four. The parts shown are the first optical pulse time spreading element or SSFBG 40 and its connected optical circulator 42 in the transmitting optical pulse time spreading device or encoder and the first optical pulse time spreading element or SSFBG 46 and its connected optical circulator 44 in the receiving optical pulse time spreading device or decoder. The two optical circulators 42, 44 are interconnected by an optical fiber 48.

In these first optical pulse time spreading elements (n=1), the quantity $\{a+(n-1)/N\}$ is equal to 0.25, the value of the parameter a. SSFBG 40 includes unit FBGs 40a, 40b, 40c, 40d that generate reflected light pulses a, b, c, d with respective relative phase values equal to successive integer multiples of $2\pi \times 0.25$: specifically, to $2\pi \times 0$, $2\pi \times 0.25$, $2\pi \times 0.5$, and $2\pi \times 0.75$ radians. In the drawing these values are indicated as 0, 0.25, 0.5, and 0.75. SSFBG 46 includes similar unit FBGs 46a, 46b, 46c, 46d that generate the same phase shifts of 0, 0.25, 0.5, and 0.75 (times $2\pi$ radians), respectively.

An optical pulse input to optical circulator 42 is spread into a chip pulse train comprising chip pulses a, b, c, d by SSFBG 40. This chip pulse train is output from optical circulator 42 and transmitted on the optical fiber 48 to optical circulator 44. Each chip pulse is then further spread by SSFBG 46. Reflected by unit FBG 46a, the transmitted chip pulse train (a, b, c, d) becomes a new chip pulse train a'. Similarly reflected by unit FBGs 46b, 46c, and 46d, the transmitted chip pulse train (a, b, c, d) also becomes new chip pulse trains b', c', and d'.

Figure 12:
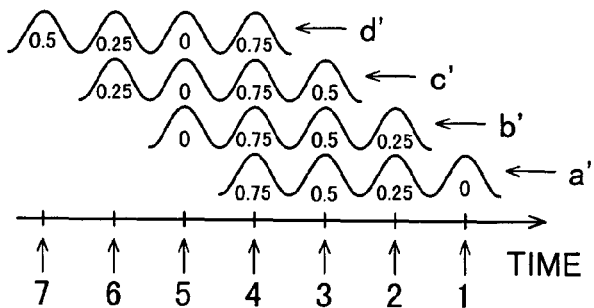
Figure 13:
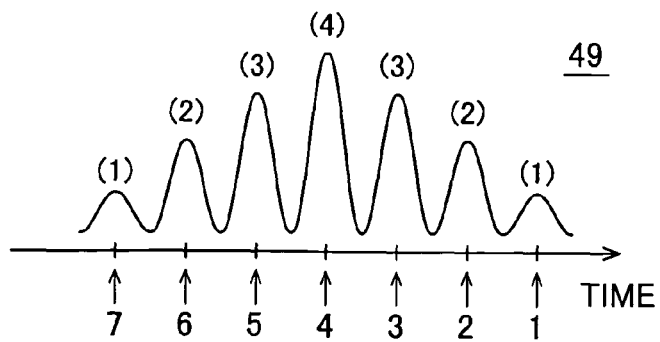

When these four new chip pulse trains a', b', c', d' exit the optical fiber 48 and optical circulator 44, they overlap on the time axis as shown in FIG. 12. Because of the equal spacing of the FBGs in the SSFBGs 40 and 46, chip pulses that are mutually aligned in time are also mutually aligned in phase and interfere constructively. As shown in FIG. 13, the autocorrelation wave 49 produced by combination of the exiting chip pulse trains a', b', c', d' comprises pulses with amplitudes that increase steadily from the ends of the waveform to the center. The amplitude at the ends of the waveform is equal to the amplitude of the individual chip pulses in chip pulse trains a', b', c', and d'. The amplitude at the center of the waveform is four times this amplitude.

Figure 14:
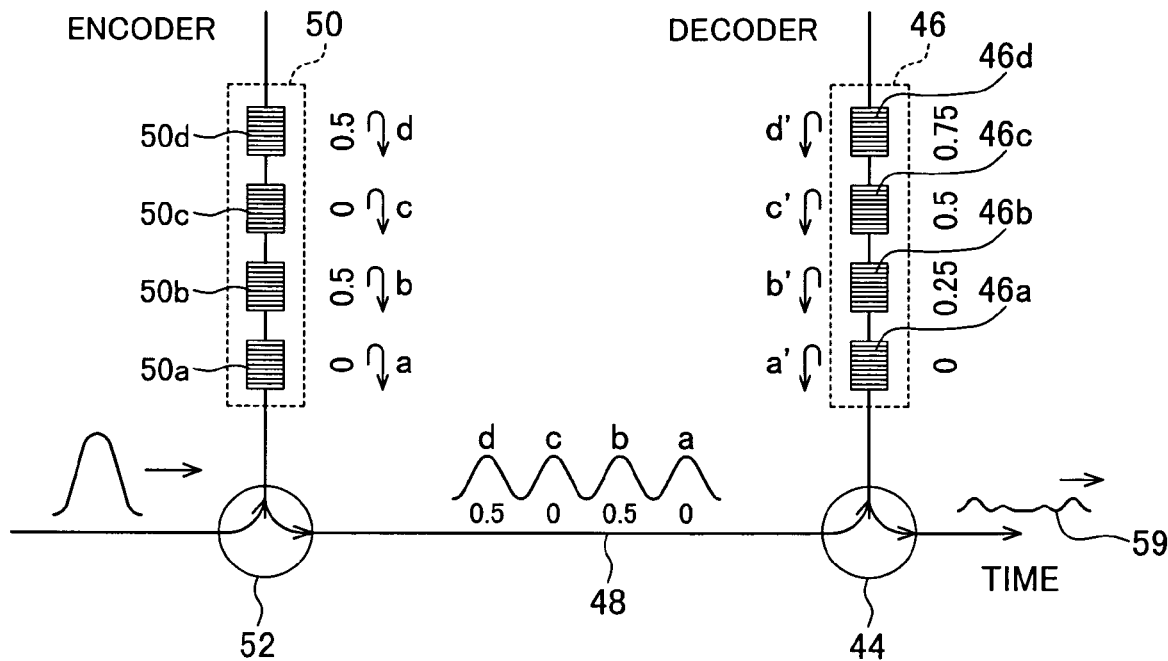
FIGS. 14, 15, and 16 schematically illustrate the generation of a cross-correlation wave in the first embodiment.

FIG. 14 illustrates the situation in which a signal transmitted by the second optical pulse spreading element (n=2) in the same transmitting optical pulse time spreading device (a=0.25, N=4, j=1) is received by the first optical pulse spreading element (n=1) in the receiving optical pulse time spreading device (a=0.25, N=4, j=1).

In the second optical pulse spreading element in the transmitting optical pulse time spreading device, the quantity $\{a+(n-1)/N\}$ is equal to $0.25+(1/4)$, that is, to 0.5. The second optical pulse spreading element accordingly comprises an SSFBG 50 with unit FBGs 50a, 50b, 50c, 50d separated by distances such that the relative phase value of light reflected from the second unit FBG 50b is $2\pi \times 0.5$. The relative phase value of light reflected from the third unit FBG 50c is $2\pi \times 1.0$, which is equivalent to zero, as indicated. The relative phase value of light reflected from the fourth unit FBG 50d is $2\pi \times 1.5$, which is equivalent to $2\pi \times 0.5$. An optical pulse entering SSFBG 50 through the optical circulator 52 in the second optical pulse time spreading element is thereby spread into a train of chip pulses (a, b, c, d) with relative phase values of 2π×0.5, 0, 2π×0.5, and 0, indicated in the drawing and below as 0.5, 0, 0.5, 0. This chip pulse train is transmitted through optical circulator 52 and optical fiber 48 to the receiving optical pulse time spreading device, which includes the same optical circulator 44 and SSFBG 46 as in FIG. 11.

Figure 15:
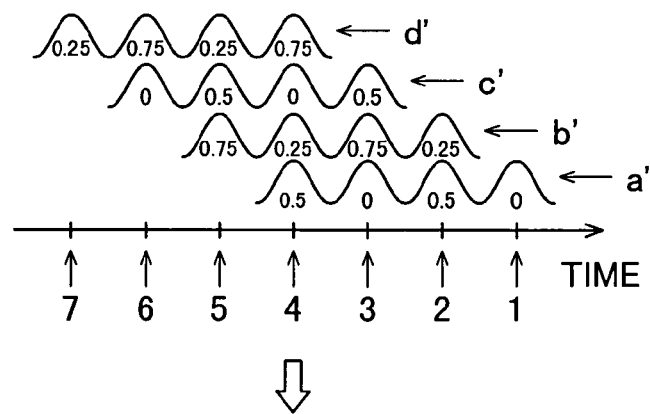

Reflection of the incoming chip pulse train (a-d) by unit FBG 46a produces a new chip pulse train a' with relative phase values of 0, 0.5, 0, 0.5. When the incoming chip pulse train is reflected by the second unit FBG 46b, its relative phase shift (0.25) is added to the above values, producing a new chip pulse train b' with relative phase values of 0.25, 0.75, 0.25, 0.75. Similarly, reflection by the third FBG 46c produces a new chip pulse train c' with relative phase values of 0.5, 0, 0.5, 0, and reflection by the third FBG 46c produces a new chip pulse train c' with relative phase values of 0.75, 0.25, 0.75, 0.25. These new chip pulse trains overlap on the time axis as indicated in FIG. 15 to generate the cross-correlation wave 59 in FIG. 16.

Figure 16:
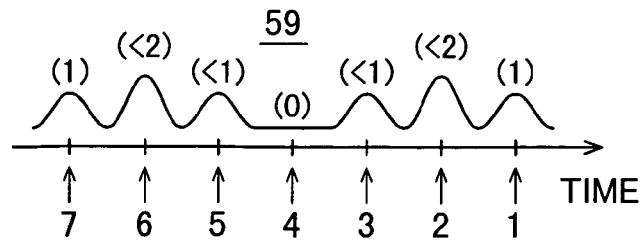

The first pulse in chip pulse train a' becomes the first pulse of the cross-correlation wave 59, shown at time 1 in FIG. 16.

Interference between the first chip pulse (having a relative phase of 0.25) in chip pulse train b' with the second chip pulse (having a relative phase of 0.5) in chip pulse train a' is partly constructive and partly destructive, producing a combined pulse with an amplitude less than twice the amplitude of the individual chip pulses from which it is produced, as indicated at time 2 in FIG. 16. (The amplitude is about 1.4 times the individual chip pulse amplitude.)

Interference between the first chip pulse (having a relative phase of 0.5) in chip pulse train c' with the second chip pulse (having a relative phase of 0.75) in chip pulse train b' is likewise partly constructive and partly destructive, and interference between the first chip pulse (having a relative phase of 0.5) in chip pulse train c' with the third chip pulse (having a relative phase of 0) in chip pulse train a' is completely destructive. The combined pulse has an amplitude less than the amplitude of one individual chip pulse, as indicated at time 3 in FIG. 16.

Interference between the first chip pulse (having a relative phase of 0.75) in chip pulse train d' with the third chip pulse (having a relative phase of 0.25) in chip pulse train b' is likewise completely destructive, and interference between the second chip pulse (having a relative phase of 0) in chip pulse train b' with the fourth chip pulse (having a relative phase of 0.5) in chip pulse train a' is completely destructive. The combined pulse at this position (time 4 in FIG. 16) has an amplitude of zero.

The pulse amplitudes at times 5, 6, and 7 in FIG. 16 are identical to the pulse amplitudes at times 3, 2, and 1, respectively.

A comparison of the amplitudes of the autocorrelation wave in FIG. 13 with the cross-correlation wave in FIG. 16 shows that the total of the pulse amplitudes of the autocorrelation wave is 16 times the individual reflected chip pulse amplitude, while the total of the pulse amplitudes of the cross-correlation wave is less than 8 times the individual reflected chip pulse amplitude. That is, the average amplitude of the autocorrelation wave is more than twice the average amplitude of the cross-correlation wave. In the conventional art shown in FIGS. 1 to 6, these two average amplitudes were equal.

Accordingly, even though the exemplary novel optical pulse time spreading elements shown in FIGS. 11 and 14 use SSFBGs with only four unit FBGs, they provide a better signal-to-noise ratio than the conventional optical pulse time spreading elements with seven unit FBGs shown in FIGS. 1 and 4.

In addition, the peak amplitude in the autocorrelation wave in FIG. 13 exceeds the peak amplitude in the cross-correlation wave in FIG. 16 by a greater factor than in the conventional waveforms shown in FIGS. 3 and 6.

Second Embodiment

Figure 17:
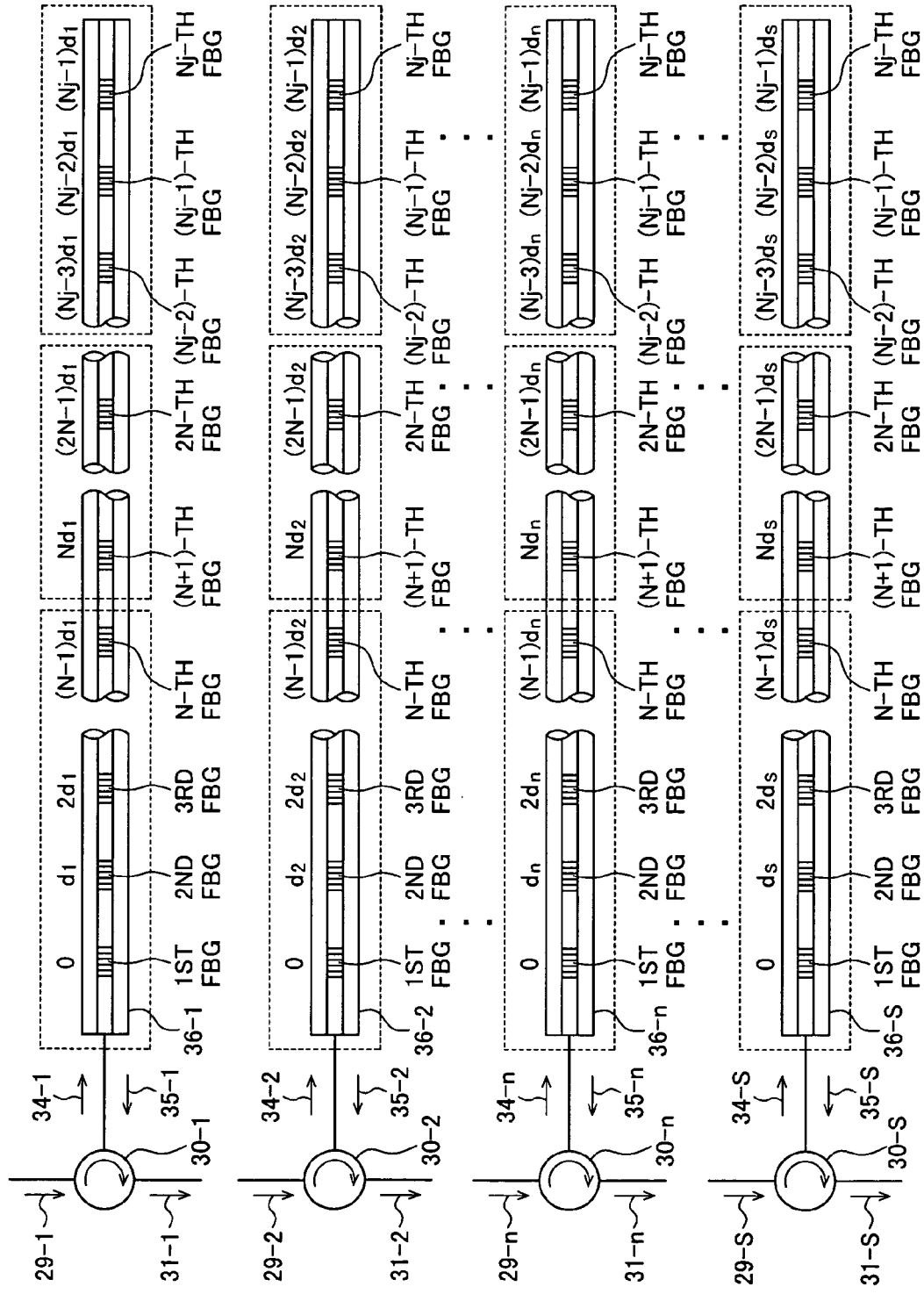
FIG. 17 schematically illustrates an optical pulse time spreading device according to a second embodiment of the invention.

Referring to FIG. 17, the second embodiment is an optical pulse time spreading device that receives S optical pulse signals 29-1 to 29-S, where S in an integer greater than one. The optical pulse time spreading device comprises S optical circulators 30-1 to 30-S that receive the corresponding input optical pulse signals 29-1 to 29-S and output corresponding chip pulse trains 31-1 to 31-S. The optical circulators 30-1 to 30-S are coupled to respective optical pulse time spreading elements 36-1 to 36-S similar to the optical pulse time spreading element described in FIGS. 7 to 9, each having N×j unit FBGs, where N is an integer equal to or greater than S and j is an integer greater than one.

Internal signals are denoted by the same reference numerals as in FIG. 10. For example, the first optical pulse time spreading element 36-1 receives an input optical pulse signal 34-1 identical to optical pulse signal 29-1 and outputs a chip pulse train 35-1 that becomes the output chip pulse train 31-1.

The relative phase values of the light reflected by the unit FBGs are the same as in FIG. 10, except that they continue to higher integer multiples of the relative phase shift imparted by adjacent unit FBGS.

The relative phase difference $d_1$ between light exiting the first optical pulse time spreading element 36-1 after being reflected by adjacent unit FBGs is $2\pi a$, where a is a real number such that $0 \leq a < 1$. If the first chip pulse in the output chip pulse train 35-1 is arbitrarily assigned a phase value of zero, the relative phase of the second chip pulse is $d_1$ or $2\pi a$, and the relative phase of the N-th chip pulse is $(N-1)d_1$ or $2\pi a \times (N-1)$ as in the first embodiment. The relative phase values continue to increase in this way. The relative phase value of the $\{(N \times j)-2\}$nd pulse is $\{(N \times j)-3\}d_1$ or $2\pi a \times \{(N \times j)-3\}$, the relative phase value of the $\{(N \times j)-1\}$st pulse is $\{(N \times j)-2\}d_1$ or $2\pi a \times \{(N \times j)-3\}$, and the relative phase value of the (N×j)-th pulse is $\{(N \times j)-1\}d_1$ or $2\pi a \times \{(N \times j)-1\}$. In the drawing, these last three relative phase values are more briefly denoted $(Nj-3)d_1$, $(Nj-2)d_1$, and $(Nj-1)d_1$.

Similarly, the second optical pulse time spreading element 36-2 outputs a chip pulse train 35-2 in which, if $d_2$ designates the relative phase difference between adjacent unit FBGs in optical pulse time spreading element 36-2, the relative phase value of the first chip pulse is zero, the relative phase of the second chip pulse is $d_2$ or $2\pi(a+(1/N))$, the relative phase of the N-th chip pulse is $(N-1)d_2$ or $2\pi(a+(1/N)) \times (N-1)$, the relative phase value of the $\{(N \times j)-2\}$nd pulse is $\{(N \times j)-3\}d_2$ or $2\pi(a+(1/N)) \times \{(N \times j)-3\}$, the relative phase value of the $\{(N \times j)-1\}$st pulse is $\{(N \times j)-2\}d_2$ or $2\pi(a+(1/N)) \times \{(N \times j)-2\}$, and the relative phase value of the (N×j)-th pulse is $\{(N \times j)-1\}d_2$ or $2\pi(a+(1/N)) \times \{(N \times j)-1\}$, the last three relative phase values being denoted $(Nj-3)d_2$, $(Nj-2)d_2$, and $(Nj-1)d_2$.

In the same way, the n-th optical pulse time spreading element 36-n outputs a chip pulse train 35-n in which, if $d_n$ designates the relative phase difference between adjacent unit FBGs in optical pulse time spreading element 36-n, the relative phase value of the first chip pulse is zero, the relative phase of the second chip pulse is $d_n$ or $2\pi(a+((n-1)/N))$, the relative phase of the N-th chip pulse is $(N-1)d_n$ or $2\pi(a+((n-1)/N)) \times (N-1)$, the relative phase value of the $\{(N \times j)-2\}$nd pulse is $\{(N \times j)-3\}d_n$ or $2\pi(a+((n-1)/N)) \times \{(N \times j)-3\}$, the relative phase value of the $\{(N \times j)-1\}$st pulse is $\{(N \times j)-2\}d_n$ or $2\pi(a+((n-1)/N)) \times \{(N \times j)-2\}$, and the relative phase value of the (N×j)-th pulse is {(N×j)−1}$d_n$ or 2π(a+((n−1)/N)×{(N×j)−1}, the last three relative phase values being denoted (Nj−3)$d_n$, (Nj−2)$d_n$, and (Nj−1) $d_n$.

The S-th optical pulse time spreading element 36-S outputs a chip pulse train 35-S in which, if $d_S$ designates the relative phase difference between adjacent unit FBGs in optical pulse time spreading element 36-S, the relative phase value of the first chip pulse is zero, the relative phase of the second chip pulse is $d_S$ or 2π(a+((S−1)/N)), the relative phase of the N-th chip pulse is (N−1)$d_S$ or 2π(a+((S−1)/N))×(N−1), the relative phase value of the {(N×j)−2}nd pulse is {(N×j)−3}$d_S$ or 2π(a+((S−1)/N)×{(N×j)−3}, the relative phase value of the {(N×j)−1}st pulse is {(N×j)−2}$d_S$ or 2π(a+((S−1)/N)×{(N×j)−2}, and the relative phase value of the (N×j)-th pulse is {(N×j)−1}$d_S$ or 2π(a+((S−1)/N)×{(N×j)−1}, the last three relative phase values being denoted (Nj−3)$d_S$, (Nj−2)$d_S$, and (Nj−1)$d_S$.

The optical pulse time spreading device in FIG. 17 may also include an optical combiner or optical splitter as discussed in the first embodiment.

Figure 18:
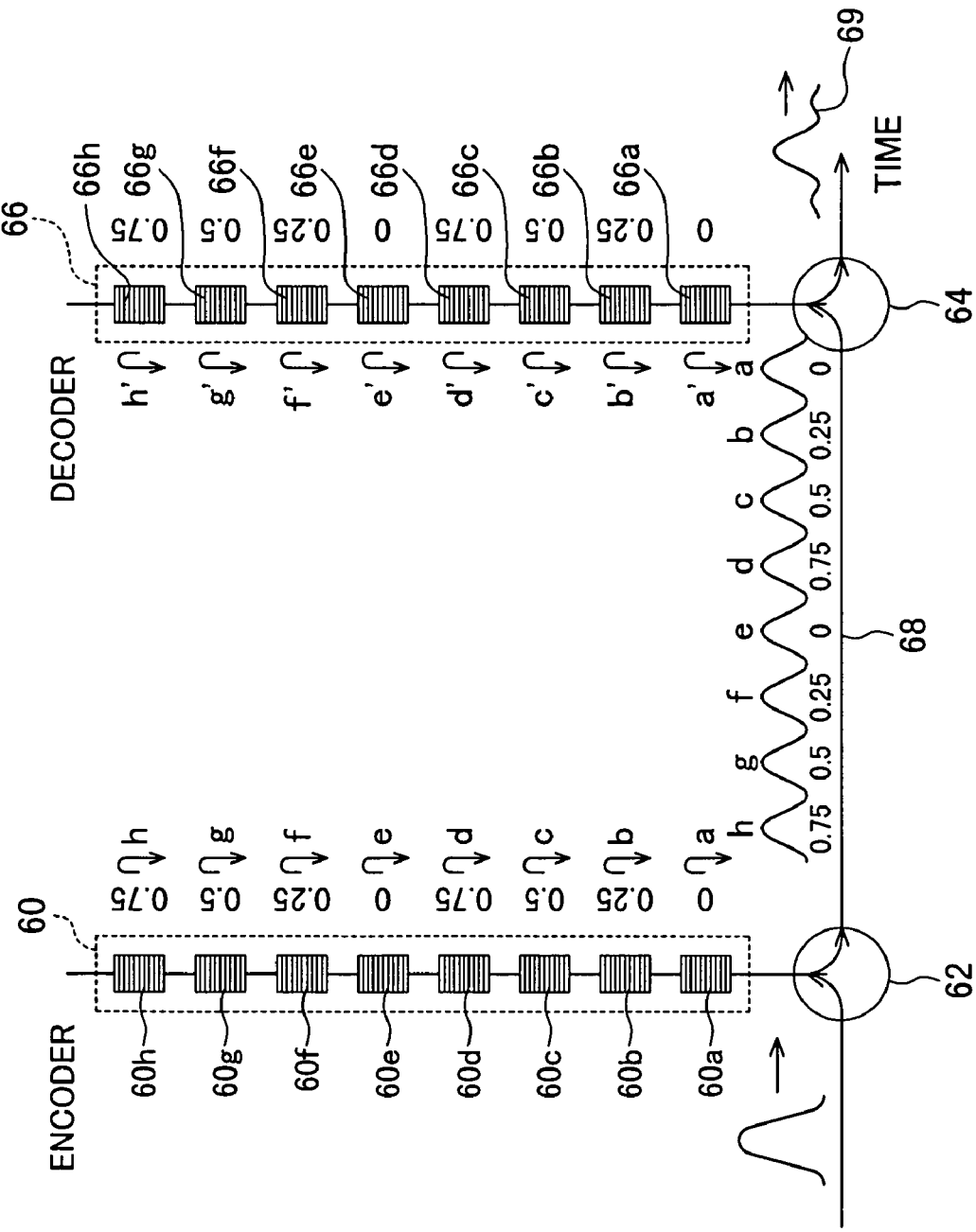
FIGS. 18, 19, and 20 schematically illustrate the recovery of an autocorrelation wave in the second embodiment.

FIG. 18 shows exemplary parts of the second embodiment in which the parameter a is 0.25, n is one, N is four, and j is two. The parts shown are the first optical pulse time spreading element, comprising SSFBG 60 and its connected optical circulator 62, in a transmitting optical pulse time spreading device or encoder and the first optical pulse time spreading element, comprising SSFBG 66 and its connected optical circulator 64, in a receiving optical pulse time spreading device or decoder. The two optical circulators 42, 44 are interconnected by an optical fiber 68.

Because n is one (n=1), the quantity {a+(n−1)/N)} is equal to a, that is, to 0.25. SSFBG 60 includes unit FBGs 60a, 60b, 60c, 60d, 60e, 60f, 60g, 60h that generate reflected light pulses a, b, c, d, e, f, g, h with respective relative phase values equal to successive integer multiples of 2π×0.25: specifically, to 2π×0, 2π×0.25, 2π×0.5, 2π×0.75, 2π×1.0 (equivalent to 0), 2π×1.25 (equivalent to 2π×0.25), 2π×1.5 (equivalent to 2π×0.5), and 2π×1.75 (equivalent to 2π×0.75). In the drawing these values are indicated as 0, 0.25, 0.5, 0.75, 0, 0.25, 0.5, and 0.75. SSFBG 66 includes similar unit FBGs 66a, 66b, 66c, 66d, 66e, 66f, 66g, 66h.

An optical pulse input to optical circulator 62 is spread into a chip pulse train comprising chip pulses a-h by SSFBG 60. This chip pulse train is output from optical circulator 62 and transmitted on the optical fiber 68 to optical circulator 64. Each chip pulse is then further spread by SSFBG 66. Reflected by unit FBG 66a, the transmitted chip pulse train (a, b, c, d, e, f, g, h) becomes a new chip pulse train a'. Similarly reflected by unit FBGs 66b-66h, the transmitted chip pulse train also becomes new chip pulse trains b'-h'.

Figure 19:
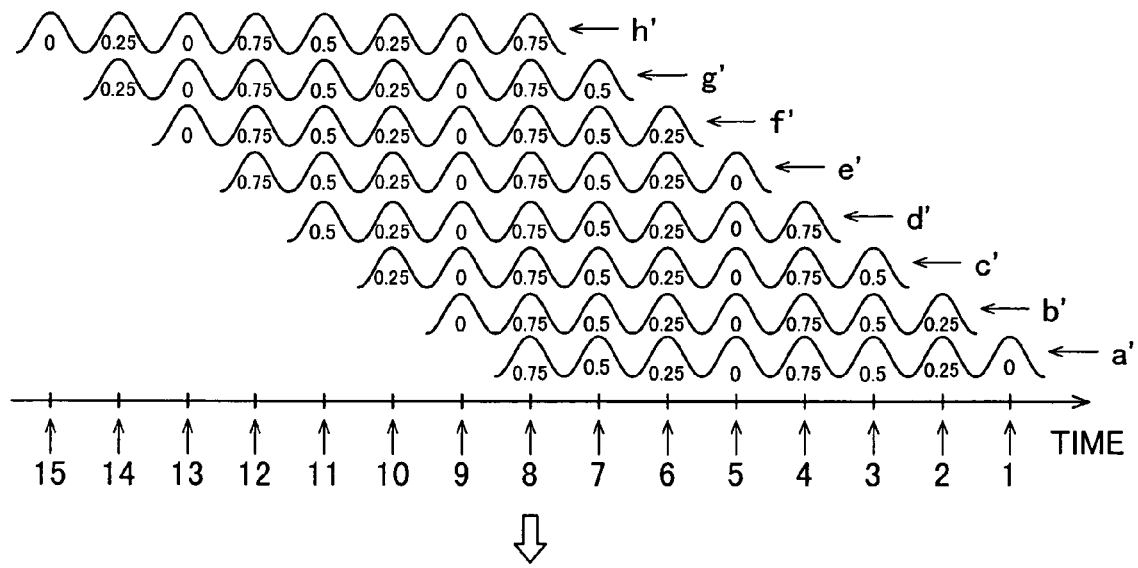
Figure 20:
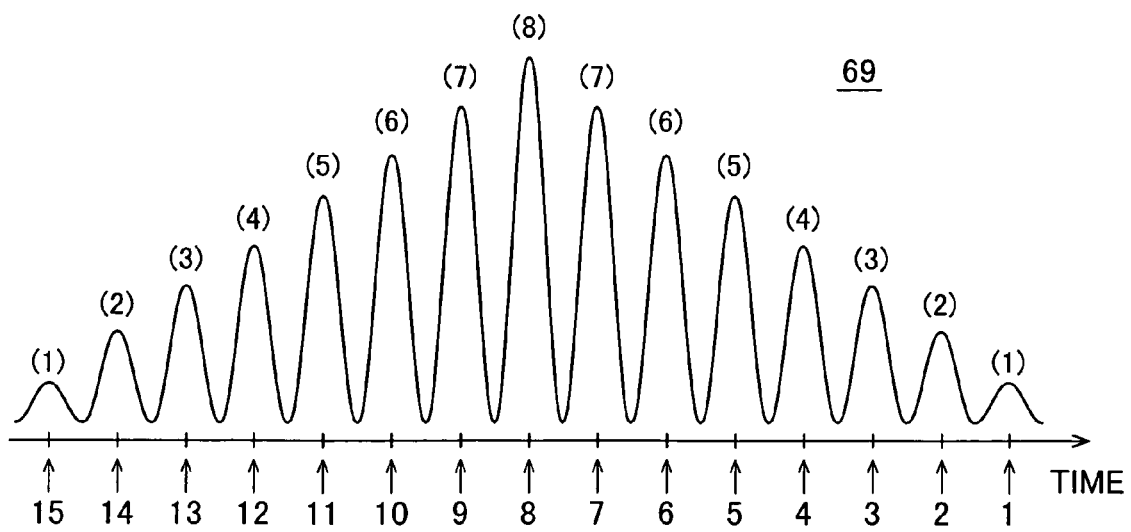

When these eight new chip pulse trains a', b', c', d', e', f', g', h' exit the optical fiber 68 and optical circulator 64, they overlap on the time axis as shown in FIG. 19. As in the first embodiment, chip pulses that are mutually aligned in time are also mutually aligned in phase and interfere constructively. As shown in FIG. 20, the autocorrelation wave 69 comprises pulses with amplitudes that increase steadily from the amplitude of an individual reflected chip pulse at the ends of the waveform to eight times that amplitude at the center.

Figure 21:
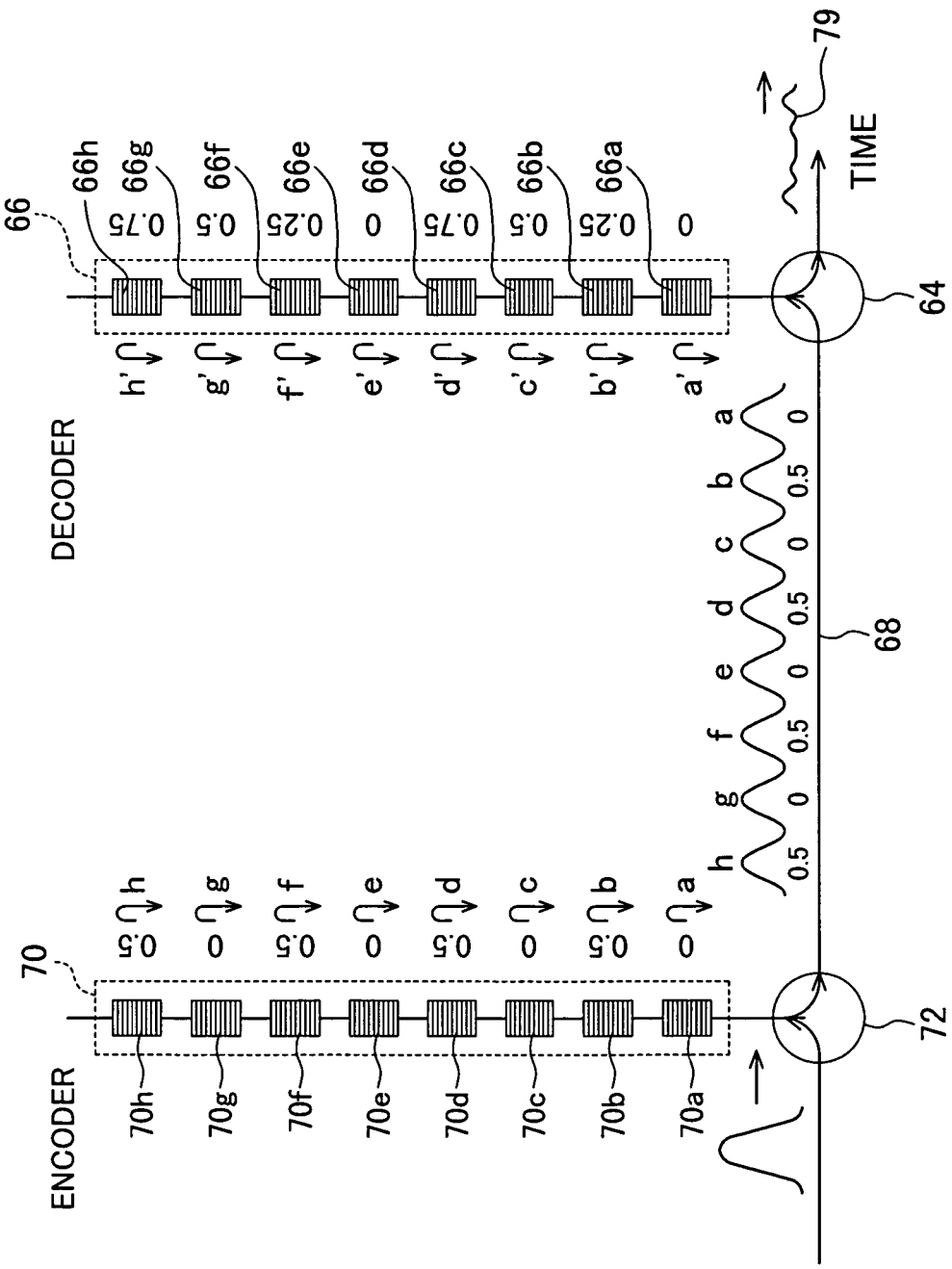
FIGS. 21, 22, and 23 schematically illustrate the generation of a cross-correlation wave in the second embodiment.

FIG. 21 illustrates the situation in which a signal transmitted by the second optical pulse spreading element (n=2) in the same transmitting optical pulse time spreading device (a=0.25, N=4, j=2) is received by the first optical pulse spreading element (n=1) in the same receiving optical pulse time spreading device (a=0.25, N=4, j=2).

In the second optical pulse spreading element (n=2) in the transmitting optical pulse time spreading device, the quantity {a+(n−1)/N)} is equal to 0.5. The second optical pulse spreading element accordingly comprises an SSFBG 70 with unit FBGs 70a, 70b, 70c, 70d, 70e, 70f, 70g, 70h separated by distances such that the relative phase value of light reflected from the second unit FBG 70b is 2π×0.5. The relative phase value of light reflected from the third unit FBG 70c is 2π×1.0, which is equivalent to zero, as indicated. The relative phase values continue to alternate between 2π×0.5 (denoted 0.5) and zero (denoted 0) through the remaining unit FBGs 70d-70h. An optical pulse entering SSFBG 70 through the optical circulator 52 in the second optical pulse time spreading element is spread into a train of chip pulses (a, b, c, d, e, f, g, h) with relative phase values that alternate between zero and 2π×0.5 (indicated as 0 and 0.5). This chip pulse train is transmitted through optical circulator 52 and optical fiber 68 to the receiving optical pulse time spreading device, which includes the same optical circulator 64 and SSFBG 66 as in FIG. 18.

Figure 22:
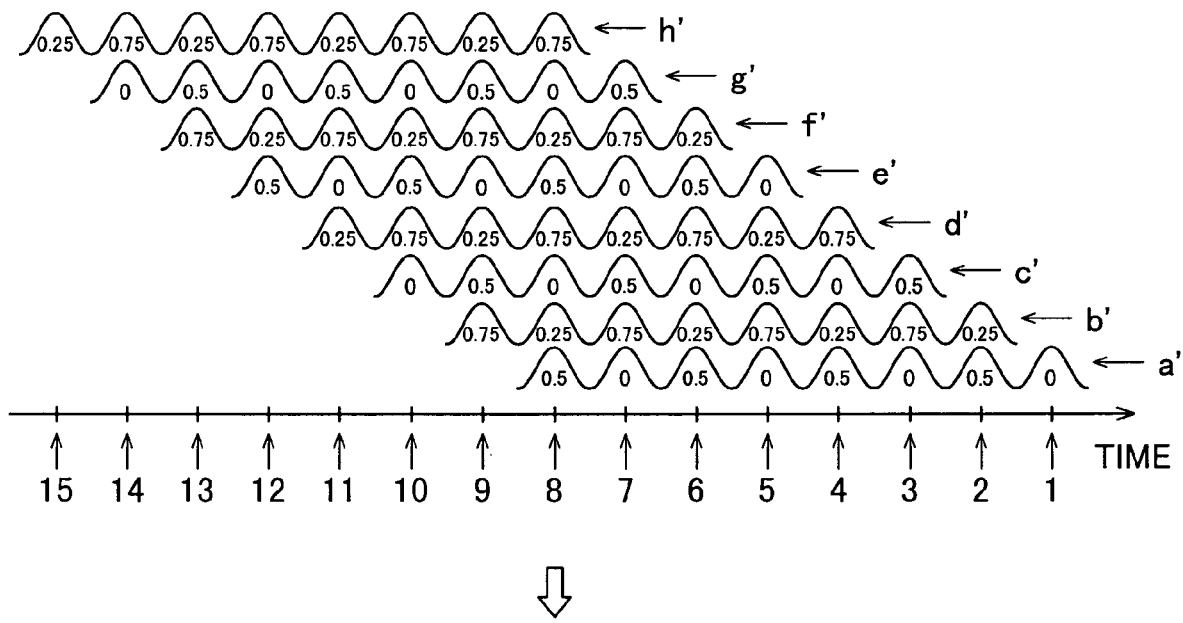

Reflection of the incoming chip pulse train (a-h) by unit FBGs 66a and 66e produces new chip pulse trains a' and e' with relative phase values (0, 0.5, 0, 0.5, 0, 0.5, 0, 0.5) that alternate between 0 and 0.5. Reflection of the incoming chip pulse train by unit FBGs 66b and 66f produces new chip pulse trains b' and f' with relative phase values of that alternate similarly between 0.25 and 0.75. Reflection of the incoming chip pulse train by unit FBGs 66c and 66g produces new chip pulse trains c' and g' with relative phase values that alternate similarly between 0.5 and 0. Reflection of the incoming chip pulse train by unit FBGs 66d and 66h produces new chip pulse trains d' and h' with relative phase values that alternate between 0.75 and 0.25. These new chip pulse trains overlap on the time axis as indicated in FIG. 22.

Figure 23:
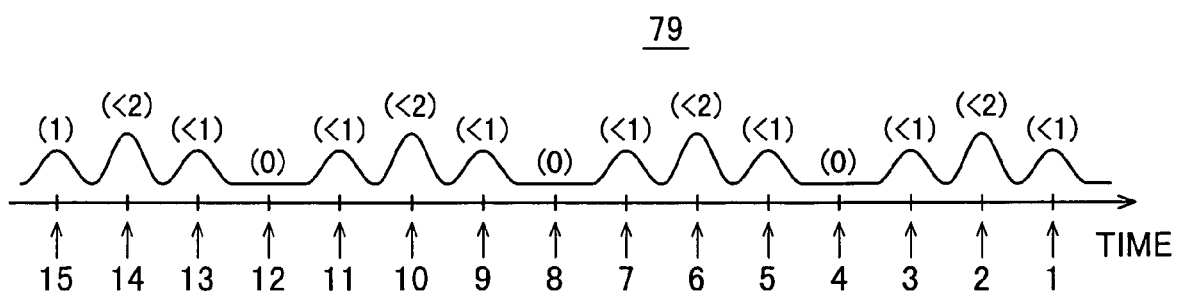

Interference among these overlapping chip pulse trains produces the cross-correlation wave 79 shown in FIG. 23.

At times 1-4, chip pulse trains a' to d' interfere as described in the first embodiment, producing the same pattern of pulses with amplitudes varying from zero to a value less than twice the amplitude of the individual reflected chip pulses.

At times 5-8, chip pulse trains a' to d' continue to interfere destructively as at time 4, and chip pulse trains e' to h' interfere to produce a pattern similar to the pattern at times 1-4, with amplitudes varying from zero to a value less than twice the amplitude of the individual reflected chip pulses.

At times 9-12, chip pulse trains e' to h' continue to interfere destructively as at time 8 and chip pulse trains a' to d' produce another pattern similar to the pattern at times 1-4, with amplitudes varying from zero to a value less than twice the amplitude of the individual reflected chip pulses.

At times 13-15, chip pulse trains e' to h' produce a pattern similar to the pattern at times 3-1.

In this example, the pulse amplitudes of the autocorrelation wave add up to 64 times the reflected chip pulse amplitude, while the pulse amplitudes of the cross-correlation wave add up to less than 16 times the reflected chip pulse amplitude. That is, the average amplitude of the autocorrelation wave is more than four times the average amplitude of the cross-correlation wave. The second embodiment accordingly provides an even better signal-to-noise ratio than the first embodiment, and the peak amplitude in the autocorrelation wave in FIG. 20 exceeds the peak amplitude in the cross-correlation wave in FIG. 23 by a factor twice as large as in the first embodiment.

To simplify the comparison of the energy of the autocorrelation waveforms and cross-correlation waveforms in the first and second embodiments and the conventional device, a value equivalent to energy will be calculated by squaring the sums of the amplitudes shown in FIGS. 3, 6, 13, 16, 20, and 23. This is equivalent to calculating the energy of a signal as the square of its average amplitude. The results are given in Table 1. The novel four-chip code refers to the example of the first embodiment shown in FIGS. 11-16, the novel eight-chip code refers to the example of the second embodiment shown in FIGS. 18-23, and the conventional seven-chip code refers to the conventional device shown in FIGS. 1-6.

TABLE 1

|  | Autocorrelation wave energy A | Cross-correlation wave energy B | Energy ratio |
| --- | --- | --- | --- |
| Novel 4-chip code | 256 | <64 | >4 |
| Novel 8-chip code | 4096 | <256 | >16 |
| Conventional 7-chip code | 289 | 289 | 1 |

In the first embodiment, using a four-chip code, the amplitude values of the autocorrelation wave in FIG. 13 add up to 16, giving a squared value or energy value (A) of 256, while the amplitude values of the cross-correlation wave in FIG. 16 add up to less than 8, giving a squared value or energy value (B) less than 64 and an energy ratio (A/B) greater than 4.

In the second embodiment, using an eight-chip code, the amplitude values of the autocorrelation wave in FIG. 20 add up to 64, giving a squared value or energy value (A) of 4096, while the amplitude values of the cross-correlation wave in FIG. 23 add up to less than 16, giving a squared value or energy value (B) less than 256 and an energy ratio (A/B) greater than 16.

In the conventional device, the amplitude values of the autocorrelation wave in FIG. 3 and the cross-correlation wave in FIG. 6 both add up to 289, giving a squared value or energy value of 289 and an energy ratio (A/B) of unity.

Both embodiments show a considerable improvement in energy ratio over the conventional device. Both embodiments also provide an adequate energy peak in the autocorrelation waveform.

Figure 24:
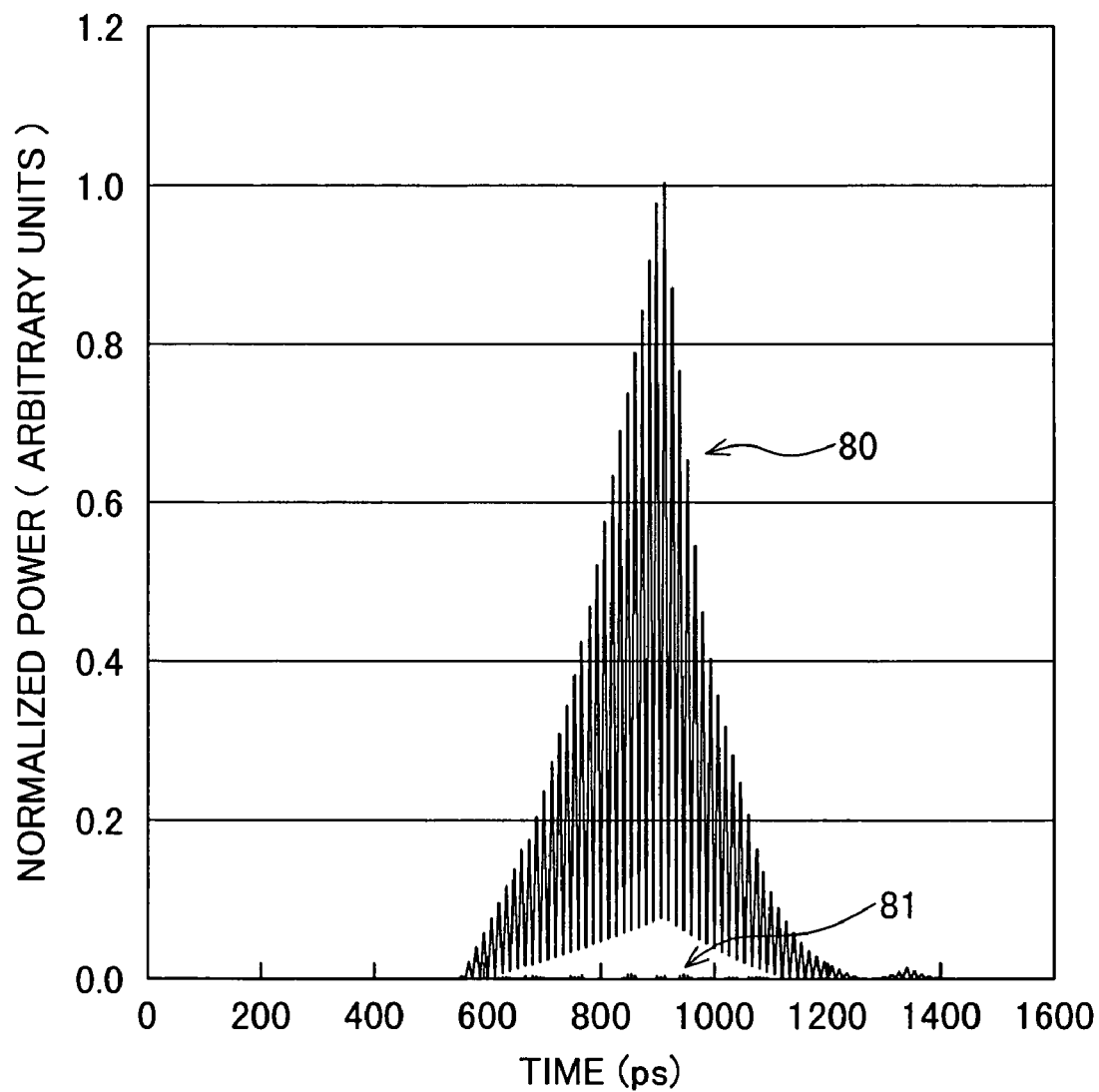
FIG. 24 illustrates waveforms of an auto-correlation wave and a cross-correlation wave generated in the first embodiment.

FIG. 24 shows an example of an autocorrelation wave and cross-correlation wave obtained by increasing the number of unit FBGs in the first embodiment from four to thirty-six (N=36, j=1). The autocorrelation waveform 80 was generated by using the first optical pulse time spreading element (n=1) for both transmitting and receiving. The cross-correlation waveform 81 was obtained by using the fourth optical pulse time spreading element (n=4) for transmitting and the first optical pulse time spreading element (n=1) for receiving.

The value of the parameter a was the same for both the transmitting and receiving optical pulse time spreading elements. This value (a) only functions as a phase constant; it does not affect the energy or peak value of the autocorrelation wave and cross-correlation wave.

The horizontal axis in FIG. 24 indicates time in picoseconds (ps). The vertical axis indicates normalized optical intensity or power (energy) in arbitrary units. The optical signal input to the transmitting device was a data signal with an optical pulse width of 3 ps and a bit rate of 622 megabits per second. The autocorrelation wave 80 and the cross-correlation wave 81 are shown on the same energy scale. Parts of the autocorrelation wave 80 have been omitted to make the cross-correlation waveform 81 visible. The waveforms indicate that the present invention can produce a cross-correlation wave 81 that has negligible energy in comparison to the autocorrelation 80 wave.

Figure 25:
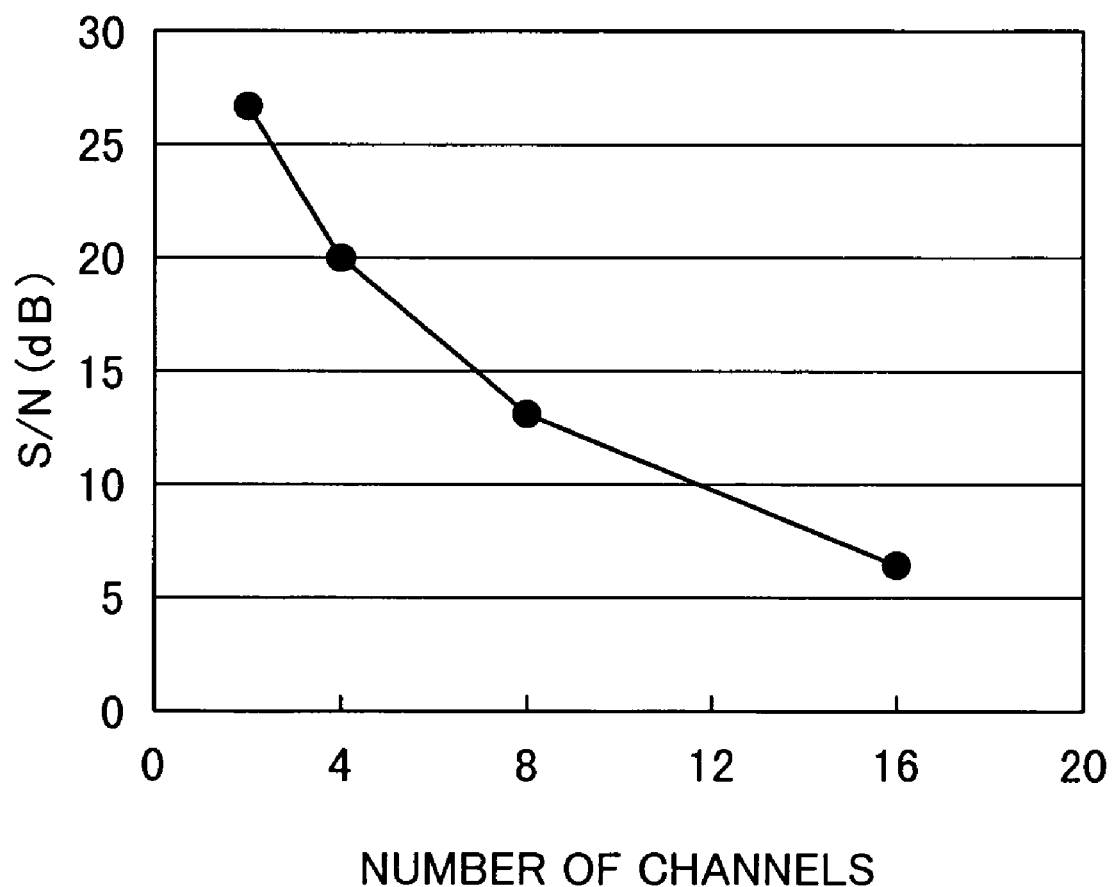
FIG. 25 is a graph of signal-to-noise ratio as a function of the number of channels in the first embodiment.

FIG. 25 shows the signal-to-noise (S/N) ratio obtained using the same transmitting and receiving devices as in FIG. 24 (N=36, j=1) when two, four, eight, and sixteen channels were transmitted simultaneously. The number of channels is indicated on the horizontal axis. The signal-to-noise ratio is indicated in decibels (dB) on the vertical axis. Although the signal-to-noise ratio increases with increasing number of channels, even with sixteen channels, a signal-to-noise ratio of approximately 6 dB was obtained.

A signal-to-noise ratio this large means that a threshold value that clearly separates the autocorrelation wave from cross-correlation waves on other channels can be set in the photodetector (not shown) that detects received data from the output of the optical circulator. That is, a high signal-to-noise ratio enables the selectivity of the photodetector to be improved by raising the detection threshold.

The photodetector operates by integrating the decoder output (e.g., the output of optical circulator 44 in FIGS. 11 and 14) over predetermined time intervals. For this reason, it is the area under the integrated part of the autocorrelation curve, rather than the peak value of the autocorrelation curve, that determines whether the received signal is detectable.

The high signal-to-noise ratio provided by the present invention also means that the integration period does not have to be restricted to a narrow interval around the autocorrelation peak; the integration period can be a comparatively wide interval including the autocorrelation peak. This considerably simplifies the design of the photodetector by eliminating the need for narrow time gating.

The maximum number of code channels provided by the novel optical pulse time spreading device is given by the parameter S. The signal-to-noise ratio can be improved by increasing the value of the parameter N or j to increase the number of unit FBGs per SSFBG, thereby increasing the number of chip pulses per chip pulse train, or in other words, increasing the code length. In conventional devices, both the number of available code channels and the signal-to-noise ratio depend on the code length.

The codes employed in conventional OCDM optical pulse time spreading devices are M-series and other such codes generated by non-obvious mathematical techniques. In contrast, the codes employed in the present invention are sequences of phase shifts that increase in regular steps and can be generated without recourse to higher mathematics.

For these reasons, the present invention provides an optical pulse time spreading device that is easy to design, as well as providing greater autocorrelation energy and a higher signal-to-noise ratio than in the past.

Figure 26:
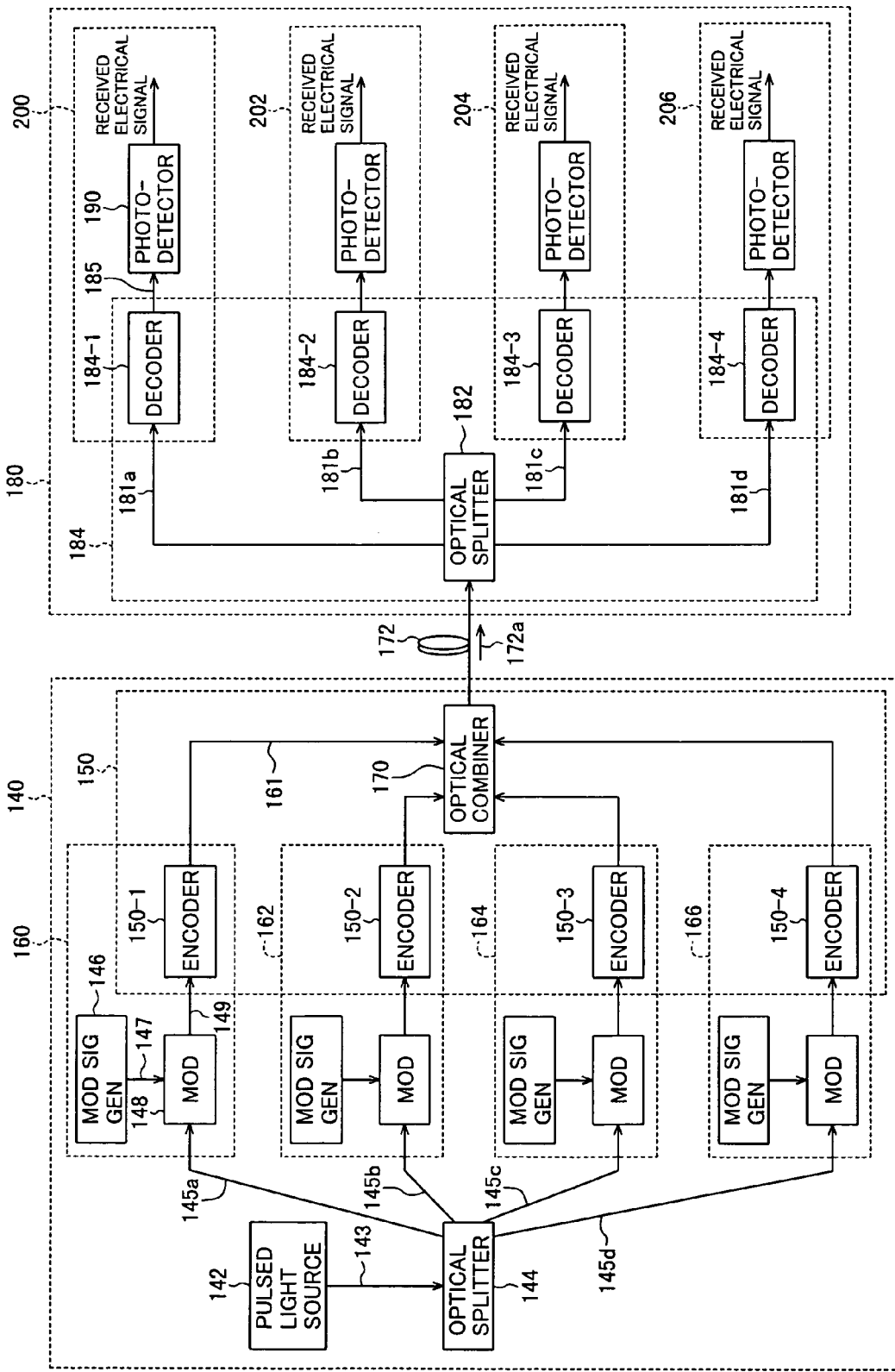
FIG. 26 is a schematic block diagram of an optical signal transmission system embodying the present invention.

FIG. 26 shows an exemplary optical transmission apparatus employing the novel optical pulse time spreading devices. The parameter S is equal to four.

The apparatus comprises transmitting and receiving units. The transmitting unit 140 includes a pulsed light source 142 that generates an optical pulse train. The pulsed light source 142 may include, for example, a distributed-feedback semiconductor laser diode (DFB-LD) with continuous-wave output, an optical modulator that chops the continuous-wave output into optical pulses spaced at regular intervals, and an optical fiber through which the pulses are output. The optical pulses 143 are supplied to an optical splitter 144 that divides the energy of each pulse into four channels, thereby producing four identical optical pulse trains 145*a*, 145*b*, 145*c*, 145*d* that are sent to respective channel units 160, 162, 164, 166.

Each channel unit includes a modulating signal generator (MOD SIG GEN) 146 that outputs an electrical pulse signal 147 to a modulator (MOD) 148. The electrical pulse signal 147 represents data to be transmitted. The modulator 148 modulates the optical pulse train received from the optical splitter 144 according to the electrical pulse signal 147, by extinguishing optical pulses corresponding to '0' bits, for example, to generate an intensity-modulated RZ optical pulse train 149.

The intensity-modulated RZ optical pulse trains 149 generated in the four channel units become the input to an optical pulse time spreading device 150 similar to the one shown in FIG. 10 or FIG. 17, with four optical pulse time spreading elements or encoders 150-1, 150-2, 150-3, 150-4, each including an optical circulator and an SSFBG. The encoders 150-1, 150-2, 150-3, 150-4 spread the intensity-modulated RZ optical pulse trains 149 into chip pulse trains 161 as explained in the first or second embodiment. The chip pulse trains 161 are combined by an optical combiner 170 and transmitted as a multiplexed optical signal 172a on an optical transmission channel 172 such as an optical fiber to the receiving unit 180.

As indicated by the dotted lines, the optical combiner 170 is part of the optical pulse time spreading device 150, and the encoders 150-1, 150-2, 150-3, 150-4 in the optical pulse time spreading device 150 also form part of the four transmitting channel units 160, 162, 164, 166.

In the receiving unit 180, the optical signal 172a is split into four identical chip pulse trains 181a, 181b, 181c, 181d by an optical splitter 182. Each of these chip pulse trains 181a, 181b, 181c, 181d includes the combined chip pulse trains 161 generated by all four transmitting channel units 160, 162, 164, 166. The identical chip pulse trains 181a, 181b, 181c, 181d are supplied to respective optical pulse time spreading devices or decoders 184-1, 184-2, 184-3, 184-4 that are identical to the corresponding encoders 150-1, 150-2, 150-3, 150-4 in the optical pulse time spreading device 150. All of these encoders and decoders have identical values of the parameter N, equal to or greater than four. The parameter n is equal to one in encoder 150-1 and decoder 184-1, to two in encoder 150-2 and decoder 184-2, to three in encoder 150-3 and decoder 184-3, and to four in encoder 150-4 and decoder 184-4.

Optical splitter 182 and the four decoders 184-1, 184-2, 184-3, 184-4 constitute an optical pulse time spreading device 184, each decoder comprising an optical circulator and an SSFBG as shown in FIG. 10 or 17.

Each of the four decoders 184-1, 184-2, 184-3, 184-4 generates a recovered optical signal 185 that includes both an autocorrelation wave, which is the decoded product of the chip pulse train 161 generated in the corresponding transmitting channel unit 160, 162, 164, or 166, and three cross-correlation waves, which are the decoded products of the chip pulse trains 161 generated in the other three transmitting channel units. As will be appreciated from FIG. 24, the energy of the autocorrelation wave far exceeds the combined energy of the three cross-correlation waves.

The recovered optical signal 185 is input to a photodetector 190 including a photodiode or equivalent device that converts the recovered optical signal to a received electrical signal 191. The photodetector 190 may also include a thresholding device with a threshold set high enough to reject the cross-correlation components but low enough to detect the autocorrelation component reliably. The received electrical signal 191 will then be an electrical pulse signal similar to the modulating electrical signal 147 in the corresponding transmitting channel unit 160, 162, 164, or 166.

The novel optical transmission system is not limited to the four channels shown in FIG. 26.

The novel optical pulse time spreading device is not limited to the use of an SSFBG. A substantially equivalent optical pulse time spreading element can be constructed by providing equally spaced Bragg diffraction gratings in any type of optical waveguide.

Instead of diffraction gratings in a waveguide, other types of phase controllers can be used to control the phase of the light in the chip pulse trains output from the optical pulse time spreading elements in the optical pulse time spreading device.

Those skilled in the art will recognize that further variations are possible within the scope of the invention, which is defined in the appended claims.

What is claimed is:

1. A pulse time spreading device comprising S optical pulse time spreading elements, from a first optical pulse time spreading element to an S-th optical pulse time spreading element, wherein:

each of the S optical pulse time spreading elements temporally spreads an input optical pulse into a chip pulse train including (N×j) chip pulses, from a first chip pulse to an (N×j)-th chip pulse, where j is an integer greater than zero, S is an integer greater than one, and N is an integer equal to or greater than S;

for each integer n from one to S, the n-th optical pulse time spreading element has (N×j) phase controllers that control the phases of light in the (N×j) chip pulses; and the light in respective chip pulses from the first chip pulse to the (N×j)-th chip pulse output by the n-th optical pulse time spreading element has respective phase angles, measured in radians relative to the phase angle of the light in the first chip pulse, equal to successive integer multiples of $$2\pi\{a+(n-1)/N\}$$

from zero to $2\pi\{a+(n-1)/N\}\times\{(N\times j)-1\}$, where a is a parameter equal to or greater than zero but less than one.

2. The pulse time spreading device of claim 1, wherein the integer j is equal to one.

3. The pulse time spreading device of claim 1, wherein the integer j is greater than one.

4. The pulse time spreading device of claim 1, wherein each of the optical pulse time spreading elements comprises an optical waveguide and the phase controllers are diffraction gratings disposed at longitudinal intervals in the optical waveguide.

5. The pulse time spreading device of claim 4, wherein the intervals are mutually equal.

6. The pulse time spreading device of claim 1, wherein each of the optical pulse time spreading elements comprises an optical fiber having a core and the phase controllers are fiber Bragg gratings disposed at longitudinal intervals in the core.

7. The pulse time spreading device of claim 6, wherein the intervals are mutually equal.

8. The pulse time spreading device of claim 1, further comprising an optical combiner for combining the chip pulse trains output from the S optical pulse time spreading elements into a multiplexed optical signal.

9. The pulse time spreading device of claim 1, further comprising an optical splitter for splitting an optical pulse signal into S mutually identical optical pulse signals and supplying the S mutually identical optical pulse signals to respective ones of the S optical pulse time spreading elements.

10. An optical communication system using the optical pulse time spreading device of claim 1 to encode S optical signals for transmission as a multiplexed signal, and to decode the multiplexed signal to obtain autocorrelation waves representing S received optical signals.

11. A method of transmitting S optical signals comprising using the optical pulse time spreading device of claim 1 to encode the S optical signals for transmission as a multiplexed signal, and to decode the multiplexed signal to obtain auto-correlation waves representing S received optical signals.

12. The method of claim 11, wherein the S optical signals have a return-to-zero format.

* * * * *